(12) United States Patent
Yerramalli et al.

(10) Patent No.: US 11,184,923 B2
(45) Date of Patent: Nov. 23, 2021

(54) LATENCY REDUCTION TECHNIQUES FOR LTE TRANSMISSION IN UNLICENSED SPECTRUM

(71) Applicant: QUALCOMM Incorporated, San Diego, CA (US)

(72) Inventors: Srinivas Yerramalli, San Diego, CA (US); Wanshi Chen, San Diego, CA (US); Jing Sun, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/406,563

(22) Filed: May 8, 2019

(65) Prior Publication Data

US 2019/0268940 A1 Aug. 29, 2019

Related U.S. Application Data

(63) Continuation of application No. 15/630,689, filed on Jun. 22, 2017, now Pat. No. 10,342,044.

(Continued)

(51) Int. Cl.
*H04W 74/08* (2009.01)
*H04W 76/28* (2018.01)
(Continued)

(52) U.S. Cl.
CPC ....... *H04W 74/0808* (2013.01); *H04W 16/14* (2013.01); *H04W 28/0205* (2013.01); *H04W 76/28* (2018.02); *H04W 72/02* (2013.01)

(58) Field of Classification Search
CPC .......................... H04W 74/0808; H04W 16/14
See application file for complete search history.

(56) References Cited

U.S. PATENT DOCUMENTS 10,342,044 B2   7/2019  Yerramalli et al.
2012/0213196 A1* 8/2012  Chung .................. H04W 74/08
                                              370/330

(Continued)

FOREIGN PATENT DOCUMENTS

WO   2013017176 A1   2/2013
WO   2016055104 A1   4/2016

(Continued)

OTHER PUBLICATIONS

Intel Corporation: "NR Operation in Unlicensed Band," 3GPP Draft; R1-164181 Intel NR Unlicensed, 3rd Generation Partnership Project (3GPP), Mobile Competence Centre; 650, Route Des Lucioles; F-06921 Sophia-Antipolis Cedex; France, vol. RAN WG1, No. Nanjing, May 23, 2016-May 27, 2016, May 14, 2016, XP051096539, 3 pages, Retrieved from the Internet: URL: http://www.3gpp.org/ftp/tsg_ran/WG1_RL1/TSGR1_85/Docs/ [retrieved on May 14, 2016].

(Continued)

*Primary Examiner* — Zhiren Qin
(74) *Attorney, Agent, or Firm* — Arent Fox LLP

(57) ABSTRACT

Various aspects described herein relate to reducing transmission latency in unlicensed spectrum. These latency reduction techniques include enabling ultra low latency (ULL) traffic to gain fast channel access. These latency reduction techniques further include updating a size of a contention window for channel access. In addition, these latency reduction techniques include enhancing CPDCCH-based signaling to accommodate the ULL frame structure. Further, these latency reduction techniques include providing robust operation against bursty interference for ULL transmissions. Moreover, these techniques include managing DRX for ULL. Additionally, these latency reduction techniques include joint scheduling of different TTI durations. These latency reduction techniques further include updating SRS transmission opportunities. In addition, these (Continued)

latency reduction techniques include reducing latency associated with PRACH transmissions. Further, these latency reduction techniques include reducing ULL transmission delays by either ignoring or cancelling scheduled uplink (e.g., LTE) transmissions.

15 Claims, 18 Drawing Sheets

Related U.S. Application Data

(60) Provisional application No. 62/366,488, filed on Jul. 25, 2016.

(51) Int. Cl.
*H04W 16/14* (2009.01)
*H04W 28/02* (2009.01)
*H04W 72/02* (2009.01)

(56) References Cited

U.S. PATENT DOCUMENTS

| | | | |
|---|---|---|---|
| 2013/0163543 A1 | 6/2013 | Freda et al. | |
| 2015/0271850 A1* | 9/2015 | Kim | H04W 74/08 370/329 |
| 2015/0334729 A1 | 11/2015 | Ji et al. | |
| 2016/0205631 A1* | 7/2016 | Chen | H04W 52/146 455/522 |
| 2016/0219627 A1* | 7/2016 | Au | H04W 72/04 |
| 2016/0360553 A1* | 12/2016 | Cheng | H04W 4/08 |
| 2017/0019909 A1* | 1/2017 | Si | H04W 76/28 |
| 2017/0048880 A1* | 2/2017 | Anderson | H04W 72/1226 |
| 2017/0055232 A1* | 2/2017 | Kim | H04W 76/27 |
| 2017/0332396 A1* | 11/2017 | Liao | H04W 72/0446 |
| 2018/0019843 A1* | 1/2018 | Papasakellariou | H04B 7/0413 |
| 2018/0027576 A1* | 1/2018 | Kowalski | H04W 72/0446 370/329 |
| 2018/0242264 A1* | 8/2018 | Pelletier | H04W 52/346 |
| 2018/0332579 A1* | 11/2018 | Kang | H04W 72/1247 |
| 2019/0215133 A1* | 7/2019 | Pan | H04W 72/0446 |

FOREIGN PATENT DOCUMENTS

| | | |
|---|---|---|
| WO | 2016072917 A2 | 5/2016 |
| WO | 2017080572 A1 | 5/2017 |

OTHER PUBLICATIONS

International Search Report and Written Opinion—PCT/US2017/039062—ISA/EPO—dated Oct. 6, 2017.

European Search Report—EP20178557—Search Authority—The Hague—dated Sep. 9, 2020.

* cited by examiner

LATENCY REDUCTION TECHNIQUES FOR LTE TRANSMISSION IN UNLICENSED SPECTRUM

CLAIM OF PRIORITY UNDER 35 U.S.C. § 119

This application is a Continuation of application Ser. No. 15/630,689 entitled "LATENCY REDUCTION TECHNIQUES FOR LTE TRANSMISSION IN UNLICENSED SPECTRUM," filed Jun. 22, 2017, which claims priority to Provisional Application No. 62/366,488, entitled "LATENCY REDUCTION TECHNIQUES FOR LTE TRANSMISSION IN UNLICENSED SPECTRUM" filed Jul. 25, 2016, both assigned to the assignee hereof by reference in their entirety.

BACKGROUND

The present disclosure relates generally to wireless communication systems, and more particularly, to techniques for reducing transmission latency in unlicensed spectrum.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Although newer multiple access systems, such as LTE, deliver faster data throughput than older technologies, such increased downlink rates have triggered a greater demand for higher-bandwidth content, such as high-resolution graphics and video, for use on or with mobile devices. As UE capabilities and demand for bandwidth increases, lower latency in communications may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, the present disclosure provides for a method of wireless communication in a wireless communication system including listen-before-talk (LBT) access for transmission. The method includes establishing, by a wireless communication device, a dedicated ultra-low latency (ULL) data bearer having LBT access rules for accessing at least a portion of an unlicensed frequency spectrum served by the wireless communication system, wherein the LBT access rules allow channel access with a faster access priority than control and signal traffic. The method further includes receiving, at the wireless communication device, data for transmission. The method further includes mapping, by the wireless communication device, the ULL data for transmission to the dedicated ULL data bearer based at least on the LBT access rules. The method further includes performing, by the wireless communication device, channel selection in the portion of the unlicensed frequency spectrum using the LBT access rules to identify a channel to use for transmission. Moreover, the method includes transmitting, by the wireless communication device, the ULL data on the dedicated ULL data bearer over the channel.

In accordance with another aspect, the present disclosure provides an apparatus for wireless communications using LBT access for transmission. The apparatus may include a transceiver for communicating the one or more wireless signals via one or more antennas, a memory configured to store instructions and one or more processors communicatively coupled with the transceiver and the memory. The one or more processors may be configured to execute the instructions to establish a dedicated ULL data bearer having LBT access rules for accessing at least a portion of an unlicensed frequency spectrum served by the wireless communication system, wherein the LBT access rules allow channel access with a faster priority than control and signal traffic. The one or more processors may be further configured to execute the instructions to receive ULL data for transmission. The one or more processors may be further configured to execute the instructions to map the ULL data for transmission to the dedicated ULL data bearer based at least on the LBT access rules. The one or more processors may be further configured to execute the instructions to perform channel selection in the portion of the unlicensed frequency spectrum using the LBT access rules to identify a channel to use for transmission. In addition, the one or more processors may be further configured to execute the instructions to transmit the ULL data on the dedicated ULL data bearer over the channel.

In accordance with another aspect, the present disclosure provides an apparatus for wireless communications using LBT access for transmission. The apparatus may include means for establishing a dedicated ULL data bearer having LBT access rules for accessing at least a portion of an unlicensed frequency spectrum served by the wireless communication system, wherein the LBT access rules allow channel access with a faster priority than control and signal traffic. The apparatus may further include means for receiving ULL data for transmission. The apparatus may further include means for mapping the ULL data for transmission to the dedicated ULL data bearer based at least on the LBT access rules. The apparatus may further include means for performing channel selection in the portion of the unlicensed frequency spectrum using the LBT access rules to identify a channel to use for transmission. In addition, the apparatus may further include means for transmitting the ULL data on the dedicated ULL data bearer over the channel.

In accordance with another aspect, the present disclosure provides a non-transitory computer-readable medium storing computer executable code for wireless communications at a wireless communication device using LBT access for transmission. The non-transitory computer readable medium may further include code for establishing a dedicated ULL data bearer having LBT access rules for accessing at least a portion of an unlicensed frequency spectrum served by the wireless communication system, wherein the LBT access rules allow channel access with a faster priority than control and signal traffic. The non-transitory computer readable medium may further include code for receiving ULL data for transmission. The non-transitory computer readable medium may further include code for mapping the ULL data for transmission to the dedicated ULL data bearer based at least on the LBT access rules. The non-transitory computer readable medium may further include code for performing channel selection in the portion of the unlicensed frequency spectrum using the LBT access rules to identify a channel to use for transmission. In addition, the non-transitory computer readable medium may further include code for transmitting the ULL data on the dedicated ULL data bearer over the channel.

In accordance with another aspect, the present disclosure provides for a method of wireless communication in a wireless communication system including LBT access for transmissions. The method includes establishing, by a wireless communication device, a dedicated data bearer having LBT rules for accessing at least a portion of an unlicensed frequency spectrum served by the wireless communication system, where the listen-before-talk access rules allow channel access in a time period corresponding to an ultra-low latency transmission time interval (TTI) based on a single defer period, and where the LBT access rules further define an additional defer period for use after a transmission associated with the channel access in the time period. The method further includes performing, by the wireless communication device, channel selection in the portion of the unlicensed frequency spectrum using the LBT access rules to identify a channel to use for transmission. In addition, the method includes transmitting, by the wireless communication device, a dedicated data bearer over the channel in the portion of the unlicensed frequency spectrum using the LBT access rules, where the transmitting corresponds to a channel access in the time period. Further, the method includes waiting the additional defer period, after the transmitting of the dedicated data bearer with the channel access in the time period, before performing a subsequent channel selection for accessing a respective channel in the portion of the unlicensed frequency spectrum to use for a subsequent transmission.

In accordance with another aspect, the present disclosure provides an apparatus for wireless communications using LBT access for transmission. The apparatus may include a transceiver for communicating the one or more wireless signals via one or more antennas, a memory configured to store instructions and one or more processors communicatively coupled with the transceiver and the memory. The one or more processors may be configured to execute the instructions to establish a dedicated data bearer having LBT rules for accessing at least a portion of an unlicensed frequency spectrum served by the wireless communication system, where the listen-before-talk access rules allow channel access in a time period corresponding to an ultra-low latency TTI based on a single defer period, and where the LBT access rules further define an additional defer period for use after a transmission associated with the channel access in the time period. The one or more processors may be further configured to perform channel selection in the portion of the unlicensed frequency spectrum using the LBT access rules to identify a channel to use for transmission. The one or more processors may be further configured to transmit a dedicated data bearer over the channel in the portion of the unlicensed frequency spectrum using the LBT access rules, where the transmitting corresponds to a channel access in the time period. In addition, the one or more processors may be further configured to waiting the additional defer period, after the transmitting of the dedicated data bearer with the channel access in the time period, before performing a subsequent channel selection for accessing a respective channel in the portion of the unlicensed frequency spectrum to use for a subsequent transmission.

In accordance with another aspect, the present disclosure provides for a method of wireless communication in a wireless communication system including LBT access for transmissions. The method includes transmitting, by a wireless communication device, a downlink subframe including ULL data and regular data, where the ULL data corresponds to a first transmission time interval that is shorter than a transmission time interval for control and signal traffic (e.g., less than 1 ms), and where the regular data corresponds to a second transmission time interval of at least for control and signal traffic (e.g., at least 1 ms). The method further includes receiving one or more acknowledgement-related messages corresponding to at least a portion of the ULL data or the regular data in the downlink subframe. In addition, the method includes updating a size of a contention window for channel access in a portion of an unlicensed frequency spectrum served by the wireless communication system having LBT access rules based on the one or more acknowledgement-related messages.

In accordance with yet another aspect, the present disclosure provides for a method of wireless communication in a wireless communication system including LBT access for transmission. The method includes transmitting a first downlink subframe having a first set of resource elements allocated to a physical downlink control channel, where the first set of resource elements includes a configuration indication that identifies a structure for a second downlink subframe to be transmitted after the first downlink subframe. The method further includes transmitting the second downlink subframe having a second set of resource elements allocated to the physical downlink control channel, where the second set of resource elements includes an ULL indicator identifying which symbols carry ULL data having a first transmission time interval that is shorter than a transmission time interval for control and signal traffic (e.g., less than 1 ms), and where the second set of resource elements includes a new configuration indication that identifies the second downlink subframe as having a different structure as compared to the structure identified by the configuration indication provided in the first downlink subframe.

In accordance with another aspect, the present disclosure provides for a method of wireless communication in a wireless communication system including LBT access for transmission. The method includes identifying a set of data resource elements for transmission in a downlink subframe. The method further includes identifying a set of reference signal resource elements for transmission in the downlink subframe. In addition, the method includes mapping both a first portion of the set of data resource elements and a first portion of the set of reference signal resource elements to one symbol of the downlink subframe. Further, the method includes mapping both a second portion of the set of data resource elements and a second portion of the set of reference signal resource elements to a subsequent symbol of the downlink subframe, where the subsequent symbol is different from the one symbol of the downlink subframe. Moreover, the method includes transmitting the downlink subframe.

In accordance with another aspect, the present disclosure provides for a method of wireless communication in a wireless communication system including LBT access for transmission. The method includes receiving, by a wireless communication device, a first slot of a downlink subframe including ULL data having a first transmission time interval that is shorter than a transmission time interval for control and signal traffic (e.g., less than 1 ms). The method further includes initiating a discontinuous reception (DRX) on period having a periodicity of less than or equal to one slot at the end of the first slot.

In accordance with another aspect, the present disclosure provides for a method of wireless communication in a wireless communication system including LBT access for transmission. The method includes scheduling a plurality of uplink transmissions each having one of a plurality of TTI lengths, wherein the plurality of TTI lengths include at least two different TTI lengths. The method further includes generating a downlink subframe having a set of resource elements allocated to a physical downlink control channel, wherein the set of resource elements includes downlink control information identifying one or more uplink grants and a respective one of the plurality of TTI lengths for each of the plurality of uplink transmissions. In addition, the method includes transmitting the downlink subframe.

In accordance with yet another aspect, the present disclosure provides for a method of wireless communication in a wireless communication system including LBT access for transmission. The method includes receiving a downlink subframe having a set of resource elements allocated to a physical downlink control channel, wherein the set of resource elements includes downlink control information identifying a scheduling grant and a TTI length associated with the scheduling grant, and wherein the TTI length comprises 1 symbol, 2 symbols, or 1 slot. The method further includes generating a sounding reference signal (SRS) when triggered by the downlink control information. In addition, the method includes mapping the SRS to a particular symbol of an uplink subframe based on the TTI length. In addition, the method includes transmitting the uplink subframe.

In accordance with another aspect, the present disclosure provides for a method of wireless communication in a wireless communication system including LBT access for transmission. The method includes transmitting, by a wireless communication device, a first uplink subframe including a random access preamble, where the random access preamble corresponds to a first TTI of 2 symbols. The method further includes monitoring a physical downlink control channel (PDCCH) for a first downlink subframe including a random access response, where the random access response corresponds to a second TTI of 2 symbols, 1 slot, or 1 ms.

In accordance with another aspect, the present disclosure provides for a method of wireless communication in a wireless communication system including LBT access for transmission. The method includes scheduling one or more uplink transmissions for up to a duration of 16 ms. The method further includes identifying ULL data for transmission over a channel in at least a portion of an unlicensed frequency spectrum served by the wireless communication system. In addition, the method includes performing, during the scheduled duration, one or more LBT procedures to contend for access to the channel. Further, the method includes determining whether contention is won for the channel based on the one or more LBT procedures. Moreover, the method includes upon determining contention is won, transmitting a downlink subframe including the ULL data over the channel.

In accordance with yet another aspect, the present disclosure provides for a method of wireless communication in a wireless communication system including LBT access for transmission. The method includes scheduling one or more uplink transmissions for up to a duration of 16 ms. The method further includes identifying ULL data for transmission over a channel in at least a portion of an unlicensed frequency spectrum served by the wireless communication system. In addition, the method includes generating a first downlink subframe having a set of resource elements allocated to a physical downlink control channel, where the set of resource elements includes an indication that identifies at least a portion of the one or more scheduled uplink transmissions are canceled. Further, the method includes transmitting the first downlink subframe over the channel. Moreover, the method includes transmitting a second downlink subframe including the ULL data over the channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
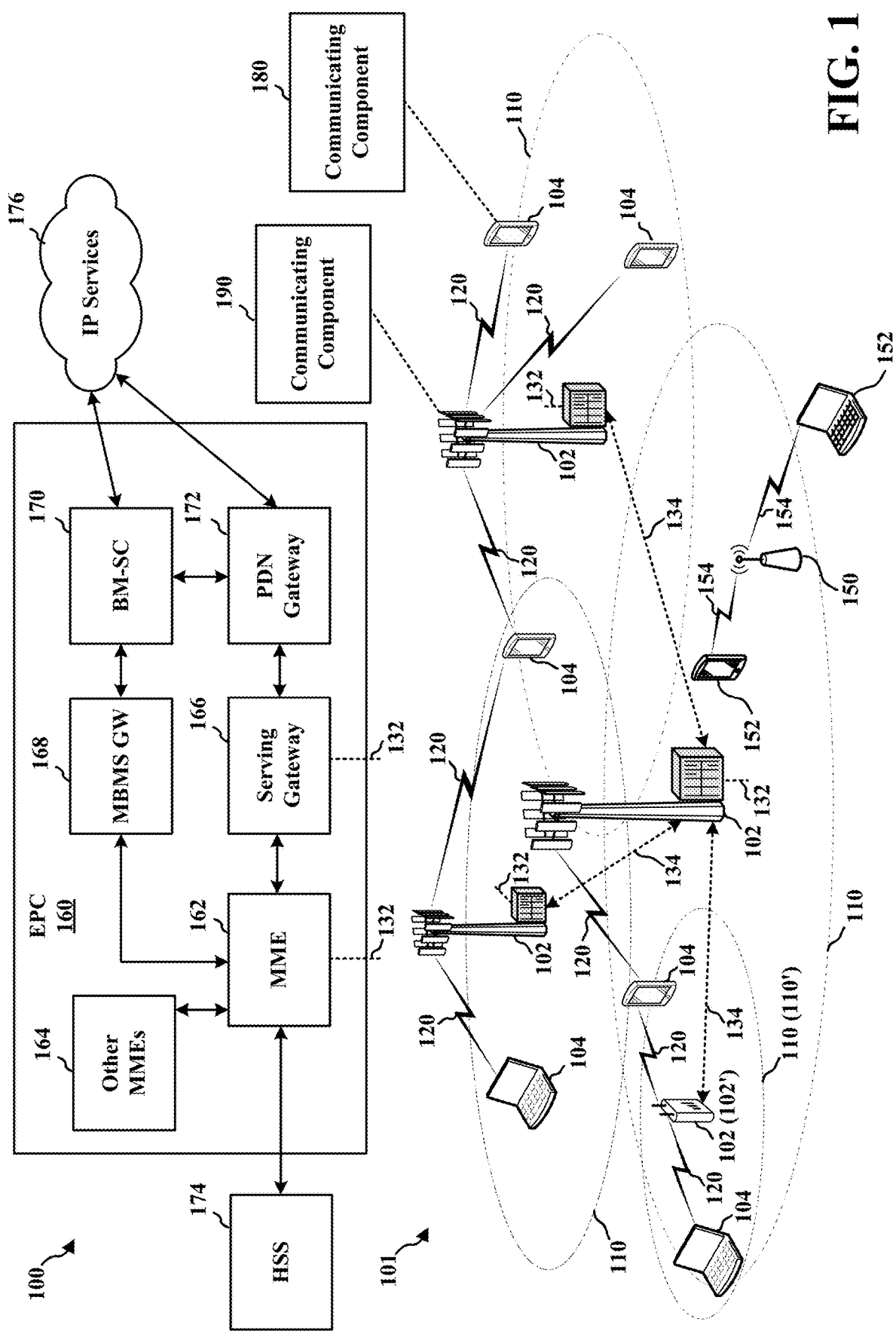
FIG. 1 is a diagram illustrating an example of a wireless communications system and an access network.

This disclosure generally relates to latency reduction techniques for LTE transmission in unlicensed spectrum.

In one high-level aspect, the latency reduction techniques described herein include enabling ULL traffic to gain fast channel access (compared to conventional channel access times) with the channel access being faster than the access priority for control and signal traffic. For example, the present disclosure includes apparatus and methods that define dedicated bearers for ULL traffic mapping. For instance, the apparatus and methods may map ULL traffic onto the highest LBT priority class, e.g., LBT priority class 1. Additionally, or alternatively, the apparatus and methods may, after transmitting ULL traffic, delay channel access or use a larger contention window size during a subsequent channel access.

In another high-level aspect, the latency reduction techniques described herein include updating a size of a contention window for channel access. For example, the present disclosure includes apparatus and methods that update the size of the contention window for channel access based on acknowledgement-related messages corresponding to ULL data and/or LTE data.

In another high-level aspect, the latency reduction techniques described herein include enhancing CPDCCH-based signaling to accommodate the ULL frame structure. For example, the present disclosure include apparatus and methods that operate to transmit an indication that a structure of a downlink subframe (e.g., ULL frame) has changed.

In another high-level aspect, the latency reduction techniques described herein include providing robust operation against bursty interference for ULL transmissions. For example, the present disclosure includes apparatus and methods that operate to map a portion of a set of data resource elements and a portion of a set of reference signal resource elements to one symbol of a downlink subframe.

In another high-level aspect, the latency reduction techniques described herein include managing DRX for ULL. For example, the present disclosure includes apparatus and methods that operate to initiate a DRX on period based on a transmission time interval of a first slot of a downlink subframe including ULL data.

In another high-level aspect, the latency reduction techniques described herein include joint scheduling of different TTI durations. For example, the present disclosure includes apparatus and methods that operate to transmit a downlink subframe including downlink control information identifying one or more uplink grants and a respective one of a plurality of TTI lengths associated with a plurality of scheduled uplink transmissions (e.g., ULL data transmissions).

In another high-level aspect, the latency reduction techniques described herein include updating SRS transmission opportunities. For example, the present disclosure includes apparatus and methods that operate to map SRS to multiple possible symbols of an uplink subframe based on a TTI length of 1 symbol, 2 symbols, or 1 slot.

In another high-level aspect, the latency reduction techniques described herein include reducing latency associated with PRACH transmissions. For example, the present disclosure includes apparatus and methods that operate to support both contention-based and contention-free PRACH procedures, where one or more messages associated with each of the PRACH procedures may correspond to a TTI length of less than 1 ms and/or with a TTI length that is less than a TTI length for control and signal traffic.

In yet another high-level aspect, the latency reduction techniques described herein include reducing ULL transmission delays. For example, the present disclosure includes apparatus and methods that operate to reduce downlink ULL transmission delays by either ignoring or cancelling scheduled uplink (e.g., LTE) transmissions so that downlink ULL data may be transmitted during the scheduled uplink duration.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an example of a wireless communications system 100 including one or more access networks 101 and one or more UEs 104 communicating with one or more base stations 102. According to the present aspects, one or more UEs 104 may include communicating component 180 and one or more base stations 102 may include a communicating component 190, with each of the communicating component 180 and communicating component 190 configured to receive, decode, transmit, and/or otherwise operate using a ULL frame structure, as described herein. In an aspect, the ULL frame structure may include a TTI that is shorter than a TTI for control and signal traffic (e.g., less than 1 millisecond (ms), e.g., one symbol, two symbols, a slot, etc.). The communicating component 180 of a respective UE 104 and the communicating component 190 of a respective base station 102 may include one or more components to reduce latency in ULL communications, e.g., for fast channel access, for contention window updating, for CPDCCH based signaling of a new frame structure, for interference handling, for discontinuous reception (DRX) management, for joint scheduling of different TTI durations, for controlling SRS transmission opportunities, for controlling PRACH transmissions, and for UL grant cancellation, etc., as discussed in more detail below.

Additionally, the wireless communications system 100 (also referred to as a wireless wide area network (WWAN)) can include an Evolved Packet Core (EPC) 160 that communicatively couples with the one or more access networks 101 to other devices and/or networks, including IP services 176. The base stations 102 may include macro cells (high power cellular base station) and/or small cells (low power cellular base station). The macro cells include eNBs. The small cells include femtocells, picocells, and microcells, any of which may be referred to as Home eNBs or simply as an eNB.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., where Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system 100 may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) or Listen Before Talk (LBT) functionality prior to communicating in order to determine whether the channel is available (e.g., generally, to avoid transmitting on a channel where another transmission is occurring, which would cause interference).

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire (when in a standalone unlicensed spectrum operation). The unlicensed frequency spectrum may also be referred to as a shared unlicensed frequency spectrum.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figures 2A, 2B, 2C, 2D:
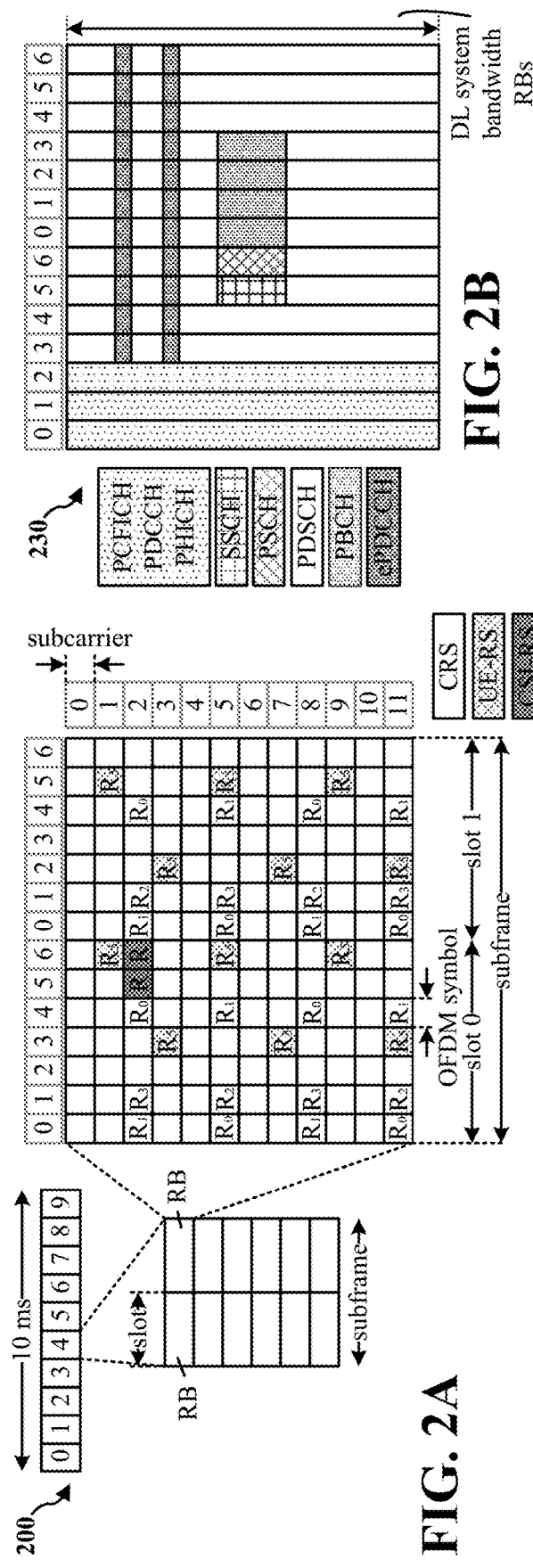
FIG. 2A is a diagram illustrating an example of a DL frame structure in LTE.
FIG. 2B is a diagram illustrating an example of channels within the DL frame structure in LTE.
FIG. 2C is a diagram illustrating an example of an UL frame structure in LTE.
FIG. 2D is a diagram illustrating an example of channels within the UL frame structure in LTE.

FIG. 2A is a diagram 200 illustrating an example of a DL frame structure in LTE, which may be utilized for ULL LTE (and/or LTE) communications between the wireless communication devices of FIG. 1, e.g., by one or more of base stations 102 or 102', UEs 104, APs 150, and/or STAs 152. FIG. 2B is a diagram 230 illustrating an example of channels within the DL frame structure in LTE, which may be utilized for ULL LTE (and/or LTE) communications between the wireless communication devices of FIG. 1. FIG. 2C is a diagram 250 illustrating an example of an UL frame structure in LTE, which may be utilized for ULL LTE (and/or LTE) communications between the wireless communication devices of FIG. 1. FIG. 2D is a diagram 280 illustrating an example of channels within the UL frame structure in LTE, which may be utilized for ULL LTE (and/or LTE) communications between the wireless communication devices of FIG. 1. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid may be divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

Diagram 230 in FIG. 2B illustrates an example of various channels within a DL subframe of a frame. The physical control format indicator channel (PCFICH) may be within symbol 0 of slot 0, and may carry a control format indicator (CFI) that indicates whether the physical downlink control channel (PDCCH) occupies 1, 2, or 3 symbols (FIG. 2B illustrates a PDCCH that occupies 3 symbols). The PDCCH may carry downlink control information (DCI) within one or more control channel elements (CCEs), each CCE may include nine RE groups (REGs), each REG may include four consecutive REs in an OFDM symbol. A UE may be configured with a UE-specific enhanced PDCCH (ePDCCH) that may also carry DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) may be within symbol 0 of slot 0 and may carry the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame, and may carry a primary synchronization signal (PSS) that can be used by a UE to determine subframe timing and a physical layer identity. The secondary synchronization channel (SSCH) may be within symbol 5 of slot 0 within subframes 0 and 5 of a frame, and may carry a secondary synchronization signal (SSS) that can be used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) may be within symbols 0, 1, 2, 3 of slot 1 of subframe 0 of a frame, and may carry a master information block (MIB). The MIB can provide a number of RBs in the DL system bandwidth, a PHICH configuration, and a system frame number (SFN). The physical downlink shared channel (PDSCH) can carry user data, broadcast system information not transmitted through the PBCH such as system information blocks (SIBs), and paging messages.

As illustrated in FIG. 2C, some of the REs may carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL.

Diagram 280 in FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH may carry uplink control information (UCI), such as scheduling requests, a channel quality indicator (CQI), a precoding matrix indicator (PMI), a rank indicator (RI), and HARQ ACK/NACK feedback. The PUSCH may carry data, and may additionally be used to carry a buffer status report (BSR), a power headroom report (PHR), and/or UCI.

ULL may be based on a multiple symbol-level, a symbol-level, or slot-level duration (e.g., a duration that is less than 1 ms subframe). The frame structure for ULL can be defined within a frequency band of LTE, and/or within a data portion of resources (e.g., excluding a portion of resources assigned for control data communication) in LTE. Moreover, at least a part of the data portion of resources, in this regard, can be divided into control and data communications for ULL, which can further be divided into one or more RB groups each comprising a plurality of RBs. Thus, a control and data region may also be defined over the RB groups for ULL communications. The control channel for ULL can be referred to herein as ULL PUCCH (uPUCCH), and the data channel for ULL can be referred to herein as ULL PUSCH (uPUSCH). Moreover, a region for transmission of ULL reference signal (uRS) may be defined with in the data region of LTE.

Figure 3:
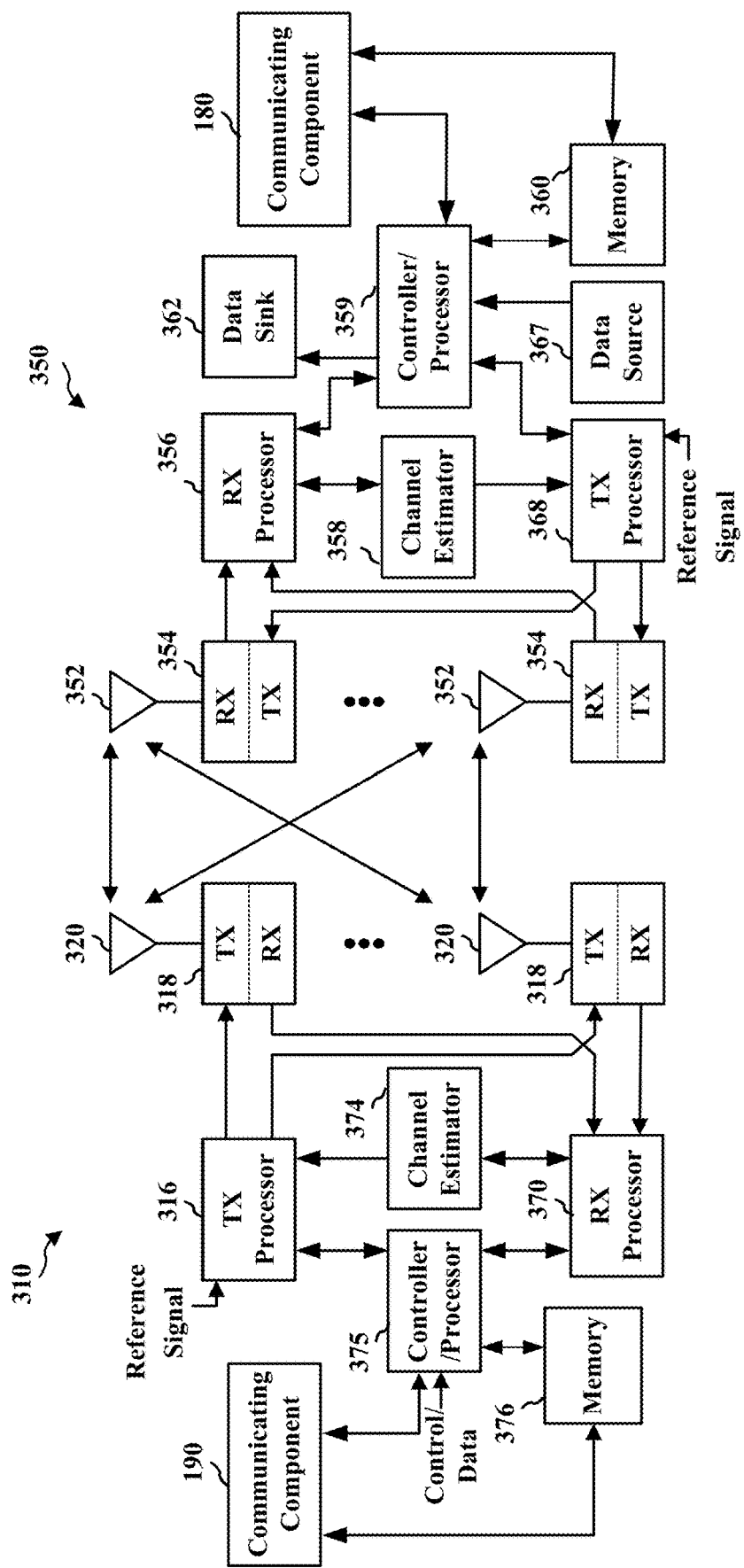
FIG. 3 is a diagram illustrating an example of an evolved Node B (eNB) and user equipment (UE) in an access network.

FIG. 3 is a block diagram of an eNB 310 in communication with a UE 350 in an access network, where the eNB 310 may be an example of base stations 102 or 102' and/or APs 150 of FIG. 1, and the UE 350 may be an example of UEs 104 and/or STAs 152 of FIG. 1. In an aspect, the communicating component 190 may be a part of the eNB 310, such as implemented within a controller/processor 375 and/or memory 376. Similarly, in an aspect, the communicating component 180 may be a part of the UE 350, such as implemented within a controller/processor 359 and/or memory 360. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream may be spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through a respective antenna 352 of the UE 350. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The IP packets are then provided to a data sink 362, which represents all the protocol layers above the L2 layer. Various control signals may also be provided to the data sink 362 for L3 processing. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
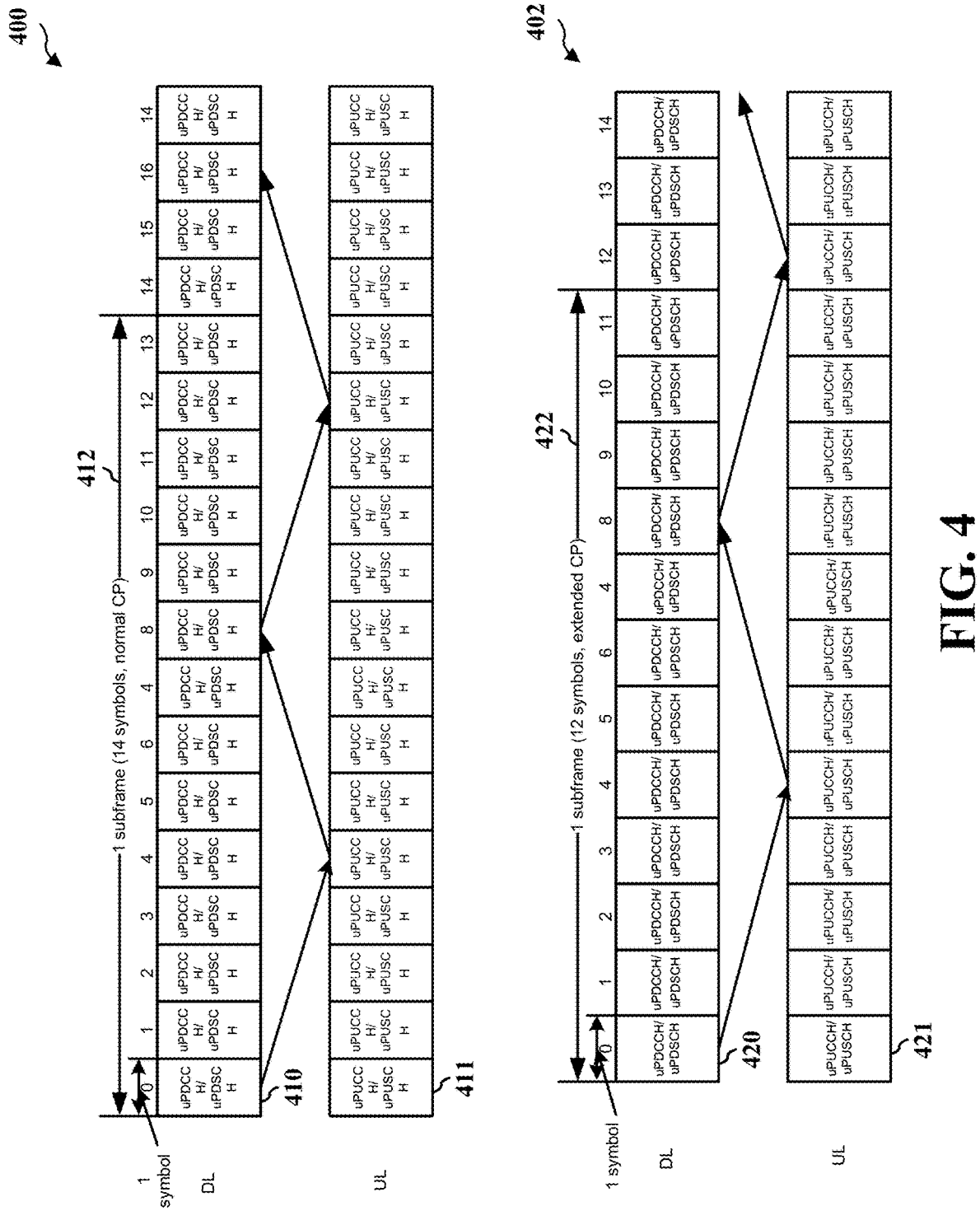
FIG. 4 is a diagram illustrating example timelines for managing ULL communications in a wireless communication system.

FIG. 4 is a diagram illustrating non-limiting examples of a ULL timelines 400, 402, with time extending from left to right in the figure, for managing ULL communications in a wireless communication system. In this example, timelines 400, 402 include ULL frames of symbol duration in each symbol of a subframe. Timelines 400, 402 both depict symbols representing a TTI for ULL physical downlink control channel (uPDCCH) and/or ULL physical downlink shared channel (uPDSCH) and symbols representing a TTI including uPUCCH and/or uPDSCH. In timelines 400, 14 symbols 410, 411, etc. are shown within a given subframe 412 (e.g., for normal CP), and in timelines 402, 12 symbols 420, 421, etc. are shown within a given subframe 422 (e.g., for extended CP). In either case, lower latency is achieved in ULL by utilizing symbol-based TTIs (e.g., a TTI that is less than the TTI for control and signal traffic, e.g., less than 1 ms or less than one subframe, as opposed to subframe-based TTIs in LTE). In other examples, a TTI may be two or more symbols, a slot of a subframe (where a subframe includes two slots), etc. In addition, HARQ process response time can be on the order of a number of symbols (e.g., 3 symbols, 4 symbols, etc.), a number of sets of symbols (e.g., 3 dual-symbols, 4 dual-symbols, etc.) a number of slots (e.g., 3 slots, 4 slots, etc.), based on the duration of the TTI for ULL communications. In the depicted example, ULL communications are 1 symbol in duration, uPDCCH/uPDSCH is sent in symbol 0, and HARQ is processed and is sent in symbol 7, etc. in the subframe. Thus, an amount of time associated with the HARQ latency in ULL communications is less than a corresponding HARQ latency in LTE communications as well based on the shortened TTI duration.

Figure 5:
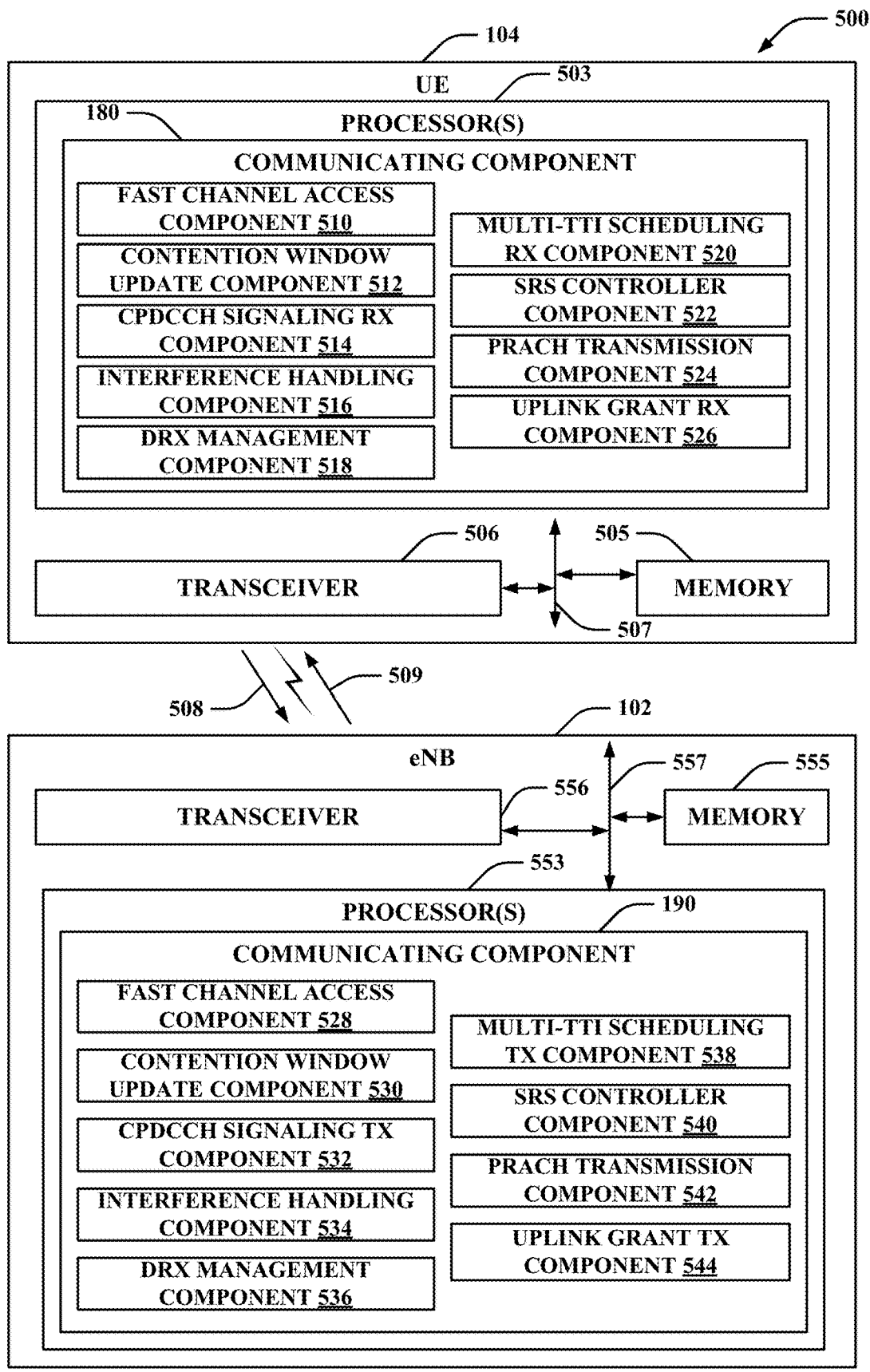
FIG. 5 is a diagram illustrating an example system for communicating using a ULL radio access technology in accordance with aspects described herein.

Referring to FIG. 5, in an example of a wireless communication system 500 similar to system 100, more detailed examples of the UE 104 and eNB 102 may each include additional system components in one example implementation of reducing latency for LTE transmissions in unlicensed spectrum.

In particular, the wireless communication system 500 includes the UE 104 that communicates with the eNB 102 to access a wireless network, examples of which are described in FIGS. 1, 3, etc., above. In particular, the UE 104 can communicate with a wireless network (e.g., EPC 160 and/or IP Services 176) via eNB 102. In an aspect, the eNB 102 and UE 104 may have established one or more downlink channels 509 over which downlink signals can be transmitted by the eNB 102 (e.g., via transceiver 556) and received by the UE 104 (e.g., via transceiver 506) for communicating control and/or data messages (e.g., signaling) from the eNB 102 to the UE 104 over configured communication resources.

Moreover, for example, the eNB 102 and UE 104 may have established one or more uplink channels over which uplink signals 508 can be transmitted by the UE 104 (e.g., via transceiver 506) and received by eNB 102 (e.g., via transceiver 556) for communicating control and/or data messages (e.g., signaling) from the UE 104 to the eNB 102 over configured communication resources. According to the present aspects, the one or more downlink channels 509 and the one or more uplink channels 508 may be used for communicating ULL data and control signaling, LTE data and control signaling, or a combination of both ULL and LTE data and control signaling.

In accordance with the present disclosure, the UE 104 may include at least one memory 505 and one or more processors 503 that may be communicatively coupled, e.g., via one or more buses 507, and may operate in conjunction with or otherwise implement the communicating component 180 for reducing latency associated with receiving and transmitting ULL (and/or LTE) communications with one or more eNBs or other network nodes, as described herein. For example, the various operations related to the communicating component 180 or subcomponents of the communicating component 180 may be implemented or otherwise executed by one or more processors 503 and, in an aspect, can be executed by a single processor, while in other aspects, different ones of the operations may be executed by a combination of two or more different processors. For example, the one or more processors 503 may include any one or any combination of a modem processor, or a baseband processor, or a digital signal processor, or an application specific integrated circuit (ASIC), or a transmit processor, receive processor, or a transceiver processor associated with transceiver 506. The memory 505 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 503. Moreover, the memory 505 or computer-readable storage medium may be resident in the one or more processors 503, external to the one or more processors 503, distributed across multiple entities including the one or more processors 503, etc.

Similarly, in an aspect, the eNB 102 may include one or more processors 553 and/or a memory 555 that may be communicatively coupled, e.g., via one or more buses 557, and may operate in conjunction with or otherwise implement the communicating component 190 for reducing latency associated with receiving and transmitting ULL (and/or LTE) communications with a UE 104, as described herein. For example, the various functions related to the communicating component 190 or subcomponents of the communicating component 190 may be implemented or otherwise executed by one or more processors 553 and, in an aspect, can be executed by a single processor, while in other aspects, different ones of the functions may be executed by a combination of two or more different processors, as described above. In one example, the one or more processors 553 and/or memory 555 may be configured as described in examples above with respect to the one or more processors 503 and/or memory 505 of UE 104.

The transceivers 506, 556 may be configured to transmit and receive wireless signals through one or more antennas, an RF front end, one or more transmitters, and one or more receivers. In an aspect, transceivers 506, 556 may be tuned to operate at specified frequencies such that UE 104 and/or eNB 102 can communicate at a certain frequency. In an aspect, the one or more processors 503 may configure transceiver 506 and/or one or more processors 553 may configure the transceiver 556 to operate at a specified frequency and power level based on a configuration, a communication protocol, etc. to communicate uplink signals 508 and/or downlink signals 509, respectively, over related uplink or downlink communication channels.

The transceivers 506, 556 can operate in multiple bands (e.g., using a multiband-multimode modem, not shown) such to process digital data sent and received using transceivers 506, 556. The transceivers 506, 556 can be multi-band and be configured to support multiple frequency bands for a specific communications protocol. The transceivers 506, 556 can be configured to support multiple operating networks and communications protocols. Thus, for example, the transceivers 506, 556 may enable transmission and/or reception of signals based on a specified modem configuration.

According to the present aspects, the communicating component 180 of UE 104 may include one or more of a fast channel access component 510, a contention window update component 512, a CPDCCH signaling receiving (RX) component 514, an interference handling component 516, a DRX management component 518, a multi-TTI scheduling receiving (RX) component 520, an SRS controller component 522, a PRACH transmission component 524 and/or an uplink grant receiving (RX) component 526 for reducing latency of ULL (and/or LTE) transmissions in unlicensed spectrum. The communicating component 190 of the eNB 102 may include one or more of a fast channel access component 528, a contention window update component 530, a CPDCCH signaling transmitting (TX) component 532, an interference handling component 534, a DRX management component 536, a multi-TTI scheduling transmitting (TX) component 538, an SRS controller component 540, a PRACH transmission component 542, and/or an uplink grant transmitting (TX) component 544 for reducing latency of ULL (and/or LTE) transmissions in unlicensed spectrum.

Fast Channel Access Schemes

More specifically, the fast channel access component 510 and/or fast channel access component 528 may be configured to enable ULL traffic to gain fast access to a channel. For example, fast channel access component 510 and/or fast channel access component 528 may be configured to define a dedicated bearer for mapping ULL traffic onto unlicensed spectrum and to transmit the dedicated bearer over a channel in the unlicensed spectrum. Additionally, or alternatively, the fast channel access component 510 and/or fast channel access component 528 may be configured to wait, after transmitting a dedicated data bearer over a channel in the unlicensed spectrum, before accessing the channel in the unlicensed spectrum again for a subsequent transmission.

Currently, in LAA, LBT functionality supports four LBT priority classes (e.g., LBT priority class 1, LBT priority class 2, LBT priority class 3, LBT priority class 4), where the smaller the LBT priority class number, the higher the priority. In LAA, all high priority traffic is mapped to LBT priority class 1. Each LBT priority class is defined by a set of parameters including at least a number of CCA slots in a defer period, a minimum contention window size (CWmin), and a maximum contention window size (CWmax). Each of these parameters are set differently for different LBT priority classes. For example, LBT priority class 1 supports a defer period of 1 slot (e.g., 25 microseconds), a CWmin of three slots, and a CWmax of 7 slots at an eNB. The LBT priority class 1 further supports a defer period of 2 slots (e.g., 34 microseconds), a CWmin of three slots, and a CWmax of 7 slots at a UE. These parameters allow traffic using LBT priority class 1 to access a channel for up to a time period of two milliseconds at both the eNB and the UE. ULL traffic is based on a transmission time interval (TTI) having a duration less than that of a legacy wireless communication technology, therefore two milliseconds is more than a sufficient amount of time for ULL traffic to access the channel. A bearer can carry ULL traffic and each bearer can map to a different LBT priority class. A duration of the time period that ULL traffic can access the channel using LBT priority 1 can be different for different frequency bands, which may have different channel bandwidths, for example. The ULL traffic can access the channel using an LBT priority that is faster than the access priority for control and signal traffic.

The presents aspects include schemes for defining dedicated bearers for mapping ULL traffic onto unlicensed spectrum. If ULL traffic can be mapped onto a dedicated bearer or to one of the high priority class bearers, then ULL traffic can be mapped to the highest priority class (e.g., LBT priority class 1), thereby reducing an amount of time required for ULL traffic to gain access to a channel. It is to be appreciated that, in some aspects, ULL traffic (e.g., due to shortened TTI such as, but not limited to 1-slot TTI) can access the channel faster than LBT priority class 1 traffic, e.g., faster than the access priority for control and signal traffic. For example, ULL traffic can access the channel with only a defer period. Therefore, to compensate, in an additional or alternative aspect, the eNB 102 or UE 104 can refrain from accessing the channel for "X" milliseconds (where "X" is a configurable value) after transmitting ULL-only traffic on the channel (e.g., using LBT priority class 1). Alternatively, the eNB 102 or UE 104 can use a larger (e.g., double) contention window size during a subsequent time the eNB accesses the channel. After transmitting ULL traffic (e.g., ULL only traffic), the eNB 102 or UE 104 can refrain from accessing the channel (e.g., the dedicated ULL data bearer) for a longer period of time before the eNB 102 or UE 104 accesses the channel for a subsequent transmission. The longer period of time can be to compensate for the faster access for the previous transmission. For example, the eNB 102 or UE 104 can double the contention window for a subsequent transmission in response to transmitting the previous transmission with a faster access.

CW Update

Further, and more specifically, the contention window update component 512 and/or contention window update component 530 may be configured to update a contention window size of the UE 104 and/or eNB 102, respectively.

In conventional implementations of LAA, the contention window size is updated based on the latest available hybrid automatic repeat request (HARQ)-ACK feedback (e.g., ACK/NACK) of the first downlink subframe. In conventional implementations of LAA, downlink transmission may not start and/or end at a subframe boundary. HARQ feedback can take a value from, e.g., ACK and NACK, where ACK refers to the situation of correct reception and NACK refers to the situation where control information (e.g., PDCCH) is correctly decoded, but there is an error in the data (e.g., PDSCH) reception. To efficiently utilize radio resources, partial subframes have been introduced in LAA, where downlink transmission, excluding a reservation signal, can start at the first or second slot boundaries of a subframe (e.g., an initial partial subframe). Depending on the starting position of the DL transmission and due to a maximum channel occupancy time (MCOT) limitation, DL transmission may not end at the subframe boundary. Further, in conventional LAA, if an initial partial subframe is used, then the contention window size is updated based on the latest available hybrid automatic repeat request (HARQ)-ACK feedback of both the initial partial subframe and the first subframe thereafter can be used.

The present aspects may include techniques for updating the contention window size. For example, in an aspect, if HARQ-ACK feedback for ULL traffic on LAA is mapped onto a licensed carrier, then the UE 104 and/or eNB 102 may have HARQ-ACK feedback available with a much earlier timeline compared to regular (e.g., LTE) transmission. As such, the HARQ-ACK feedback of ULL traffic transmitted by the UE 104 and/or eNB 102 in the first subframe may be available at an earlier time at the eNB 102 and/or UE 104, respectively. Accordingly, in an aspect, the contention window size of the UE 104 and/or eNB 102 may be updated based on all available HARQ-ACK feedback at the UE 104 and/or eNB 102 from ULL and/or LTE transmissions in the first "X" milliseconds (where "X" is a configurable value). In an additional or alternative aspect, HARQ-ACK reporting for ULL traffic may treated with a different weight compared to regular traffic when determining whether to update (e.g., increase or decrease) the size of the contention window. For example, ULL traffic is coded towards lower latency and therefore, may not need to be re-transmitted as many times as, for example, LTE traffic. Accordingly, in an aspect, the contention window update component 512 of the UE 104 and/or the contention window update component 530 of the eNB 102 may assign a weighting factor such as, but not limited to, a group weighting by type to ULL traffic and/or regular (e.g., LTE) traffic. For example, in an aspect, one weight may be applied to ACKs received for ULL traffic and another weight may be applied to ACKs received for regular traffic. For example, the eNB 102 and/or UE 104 may receive four ACKs and two NACKs for ULL traffic and may also receive two ACKs for regular traffic. In this example, the contention window update component 512 and/or contention window update component 530 may apply a first weight to each ACK received for regular traffic and may apply a second weight equal to half of the first weight to each ACK received for ULL traffic. Alternatively, in an aspect, the contention window update component 512 of the UE 104 and/or the contention window update component 530 of the eNB 102 may assign a weight of zero to each ACK received for ULL traffic.

CPDCCH Based Signaling of New Frame Structure

Also, more specifically, the CPDCCH signaling receiving (RX) component 514 and/or CPDCCH signaling transmitting (TX) component 532 may be configured to enhance CPDCCH-based signaling to accommodate updating an ULL frame structure, e.g., for a current subframe. For example, in an aspect, the CPDCCH signaling RX component 514 and CPDCCH signaling TX component 532 may each be configured to both transmit and receive CPDCCH-based signaling. Alternatively, one of the CPDCCH signaling TX component 532 or the CPDCCH signaling RX component 514 may be configured to transmit CPDCCH-based signaling while the other component may be configured to receive and interpret the CPDCCH-based signaling, and act accordingly based on the received CPDCCH-based signaling.

In 3GPP Release 13 LAA, common PDCCH (CPDCCH) is used to indicate the configuration of a current and next subframe for downlink transmission. For example, in LAA, the CPDCCH is used to indicate the number of OFDM symbols of the current 'n−1' and the next subframe 'n' for downlink transmission. Information for subframe 'n' can be carried in both subframe 'n−1' and subframe 'n.'

The present aspects may include techniques for enhancing CPDCCH-based signaling to accommodate the ULL frame structure. For example, in an aspect, if ULL traffic is carried in subframe 'n,' then the configuration of subframe 'n' can be changed on the fly. The eNB 102 may indicate in the CPDCCH of subframe 'n' that the structure of the subframe 'n' has changed. The UE 104 can then follow the updated configuration as indicated in the CPDCCH transmitted by the eNB 102. For example, a few bits in the CPDCCH can indicate the configuration of the current subframe, including which symbols of the current subframe carry ULL traffic, etc. The CPDCCH can further indicate a few different subframe types as part of this CPDCCH-based signaling. For example, the CPDCCH can indicate subframe types such as, but not limited to, DL subframe, UL subframe, flexible frame structure 1, and/or flexible frame structure 2. In an aspect, the flexible frame structure can include downlink (D) and uplink (U) portions. For example, flexible frame structure 1 can include DD U U U D D U U U D U, etc. The flexible frame structures can be preconfigured by the eNB 102 according to the standardization in, e.g., 3GPP Release 13 or by RRC configuration. The D and U portions of the flexible frame structure may be arranged such that the UE 104 may decode transmission at an earlier time, for example.

Moreover, the eNB 102 can impose certain restrictions on changing a flexible frame structure from one type to another (e.g., from flexible frame structure 1 to flexible frame structure 2, or vice versa). For example, a downlink subframe cannot be changed to an uplink subframe, but can be changed to, e.g., flexible frame structure type 1.

Interference Handling

Additionally, and more specifically, the interference handling component 516 and/or interference handling component 534 may be configured to provide more robust operation against bursty interference for ULL transmissions.

In conventional implementations of LAA, ULL transmissions can experience bursty interference from, e.g., small WiFi packets and/or other ULL transmissions, particularly from a hidden node. The hidden node may be a first UE (e.g., first STA 152) hidden from a second UE (e.g., second STA 150). For example, the first UE may transmit on a same access node (e.g., AP 150 in FIG. 1) as the second UE, but the first UE may be out of range of the second UE. Thus, the second UE may not be hidden from (e.g., unable to listen to) the first UE.

The present aspects include techniques for providing more robust operation against bursty interference for ULL transmissions such as, but not limited to, 2-symbol TTI and/or 1-slot TTI ULL transmissions.

Figure 6:
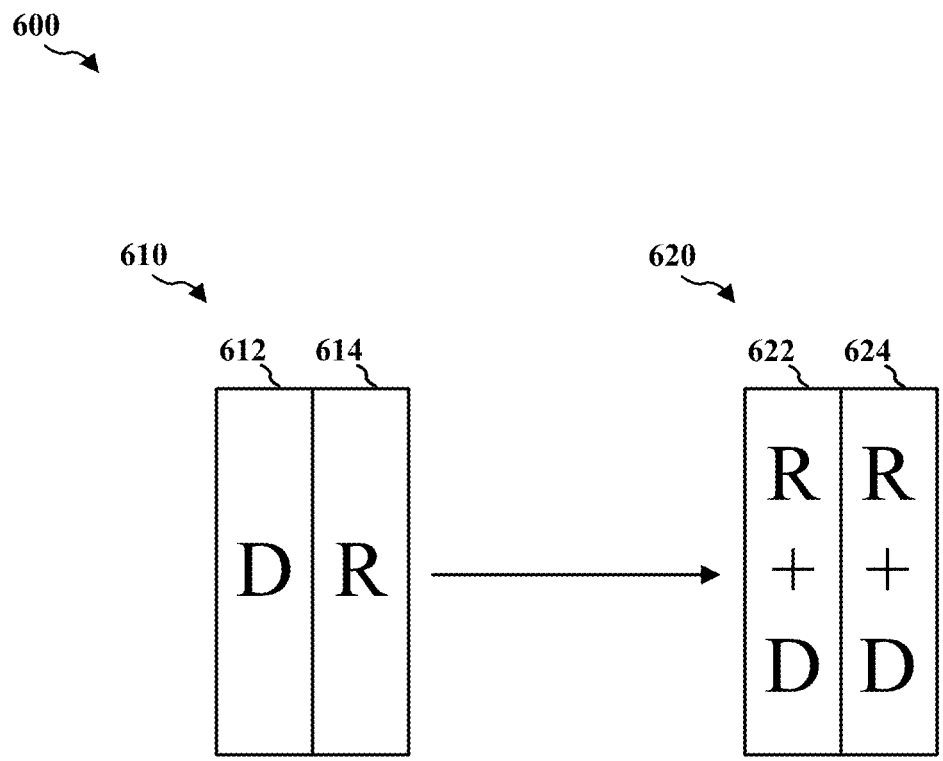
FIG. 6 is a diagram illustrating an example of providing robust operation against bursty interference for ULL transmissions.

Referring to FIG. 6, a diagram 600 illustrates an aspect of providing robust operation against bursty interference for ULL transmissions. For example, a conventional 2-symbol TTI ULL frame 610 is illustrated in FIG. 6. The 2-symbol TTI ULL frame portion 610 may include, for example, a reference signal (RS) mapped to resource elements (REs) of a first OFDM symbol 612 and data mapped to REs of a second OFDM symbol 614. In contrast, according to the present aspects, the RS and data symbols may be mixed such that if one of the symbols experiences overwhelming interference, the other symbol can allow for the decoding of the ULL frame. For example, in an aspect, a 2-symbol TTI ULL frame portion 620 may include the RS and data symbols mixed within a symbol period, such that a first OFDM symbol 622 and second OFDM symbol 624 each include a combination of RS REs and data REs. In an aspect, the first symbol 622 may contain more RS REs than the second symbol 624 for front-loaded demodulation. By mixing the RS and data symbols, the TTI ULL frame portion 620 can still be decoded even if transmission of the TTI ULL frame 620 experiences bursty interference from, e.g., other ULL transmissions.

DRX Management for ULL

The DRX management component 518 and/or DRX management component 536 may be configured to manage DRX for ULL traffic.

In conventional implementations of LAA/eLAA, a UE is required to monitor possible DL transmissions starting from a subframe boundary or the second slot of a subframe. That is, the DL transmission from an eNB is either an entire subframe, or a partial subframe, containing the entire second slot. However, a ULL frame may have a duration of one slot or 2-symbol TTI.

The present aspects may include a method for managing discontinuous reception (DRX) for ULL traffic.

Figure 7:
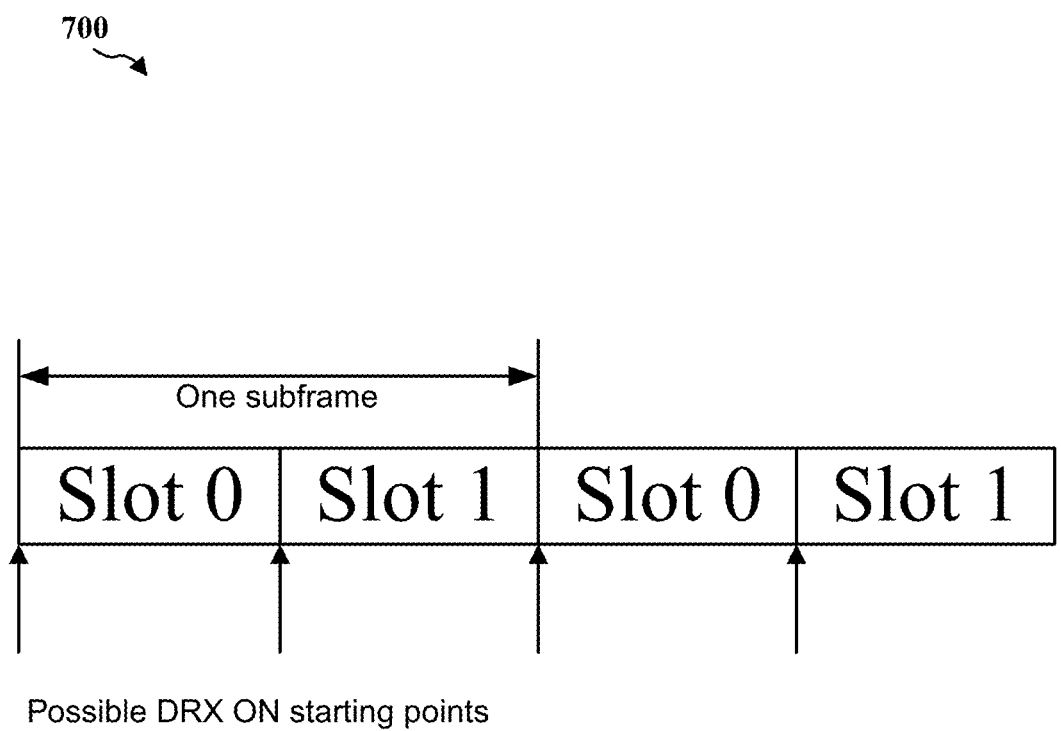
FIG. 7 is diagram illustrating an example frame structure for managing DRX for ULL transmissions.

Referring to FIG. 7, an example of a frame structure 700 illustrates an aspect of managing DRX for ULL. In this aspect, DRX for ULL may be aligned with a reference signal or a configured boundary such as, but not limited to, a subframe and/or slot boundary (e.g., see "possible DRX ON starting points"). For example, configuration of DRX periodicity can be based on slot durations for both 1-slot and 2-symbol TTIs. In addition, the DRX periodicity can be based on a 1-ms TTI. The DRX on configuration, inactivity timer, control channel monitoring can each be based on the TTI durations of ULL frames (e.g., 2-symbol or 1-slot). Accordingly, the design of the DRX for ULL can be simplified such that 1-ms, 1-slot, and 2-symbol TTIs share same potential starting transmission opportunities. In addition, the UE may not consume too much power (e.g., for monitoring in more occasions).

Joint Scheduling of Different TTI Durations

The multi-TTI scheduling TX component 538 may be configured to jointly schedule multiple TTIs of different durations. In addition, multi-TTI scheduling RX component 520 may be configured to receive the jointly scheduled TTIs from the multi-TTI scheduling TX component 538.

In 3GPP Release 14 eLAA, uplink multi-TTI scheduling can be enabled using Format 0B and Format 4B DCIs. In LTE, all of the scheduled TTIs are of the same duration and up to four different uplink grants can be received in a subframe. However, ULL may be based on a multiple symbol-level, a symbol-level, or slot-level duration (e.g., a duration less than a 1-ms subframe). That is, scheduled TTIs for ULL traffic may each have a different duration.

The present aspects may include techniques for jointly scheduling TTIs for ULL traffic. In an aspect, for example, the eNB 102 can transmit multiple TTI grants each addressing a different TTI length in one subframe. For example, the eNB 102 can transmit two grants in a subframe, where the first grant can schedule a TTI duration of 2 symbols and the second grant can schedule a TTI duration of 1 slot. Alternatively, the eNB 102 can schedule multiple TTIs each of a different duration using a single grant. The order and duration of TTI lengths can be derived from the DCI format used (e.g., Format 0B and/or Format 4B DCI) or as in explicit indication using bits in the DCI. In addition, the eNB 102 can indicate multiple HARQ IDs, where each HARQ ID corresponds to a different TTI duration. For example, a first HARQ ID can correspond to a first TTI length and a second HARQ ID can correspond to a second TTI length.

SRS Transmission Opportunities

The SRS controller component 522 may be configured to update SRS transmission opportunities (e.g., locations). In addition, SRS controller component 540 may be configured to send, e.g., an RRC configuration to update the SRS transmission opportunities to SRS controller component 522.

In 3GPP Release 14 eLAA, SRS can only be transmitted in the same transmission opportunities as in the licensed spectrum. For example, the SRS is always transmitted in the last OFDM symbol of an uplink subframe (e.g., Uplink Pilot Time Slot (UpPTS) of special subframes). For SRS triggered from downlink grants, timing indication is provided in the subframe. For SRS triggered from uplink grants, SRS is always multiplexed with PUSCH. In 3GPP Release 14, SRS carrier based switching can bring more SRS transmission opportunities in the licensed spectrum (e.g., multiple possible SRS transmission symbols in an uplink subframe).

In an aspect, SRS transmission locations can be updated by taking into account ULL subframe structure using, for example, RRC configuration. If the ULL subframe structure is a flexible frame structure type 1, then the SRS may transmitted in, e.g., the second symbol of the uplink subframe. Alternatively, if the ULL subframe structure is a flexible frame structure type 2, then the SRS may be transmitted in, e.g., the third symbol of the uplink subframe. In addition, for SRS triggered from UL subframes, SRS can be multiplexed with short PUSCH (sPUSCH). Moreover, the location of SRS in multi-TTI grants with 1-subframe TTI may be configured differently than the location of SRS in multi-TTI grants with smaller slot TTI (e.g., 1-slot or 2-symbol TTI).

PRACH Transmissions

The PRACH transmission component 524 and/or PRACH transmission component 542 may be configured to reduce latency associated with PRACH transmissions.

In an aspect, both 2-step and 4-step PRACH procedure can be supported for ULL transmissions. An eNB 102 can implement either the 2-step or the 4-step PRACH procedure depending on the situation. For example, the eNB 102 can implement the 2-step PRACH procedure in order to request uplink resources faster. In this case, the eNB 102 assumes that a UE is in the connected state. Further, the 2-step PRACH procedure may be similar in concept to contention based PUSCH, but may only be used for RACH purposes. Additionally, or alternatively, the eNB 102 can implement the 4-step PRACH procedure in order to enable connection setup, handover, etc.

In an additional or alternative aspect, a new TTI based PRACH procedure can be supported for ULL transmissions. The new TTI based PRACH procedure may include response window size based on new TTIs. For example, Message 2, 3 (if supported), and 4 (if supported) can be based on 2-symbol TTI, 1-slot TTI or 1-ms TTI. Message 1 can still be based on legacy 2-symbol PRACH (format 4), or other formats. Differentiation of different TTI can be based on resource partitioning in PRACH, an indicator in PRACH (if the PRACH carries a payload), resource partitioning in Message 2, or an indicator in PDCCH DCI for non-contention based PRACH.

UL Grant Cancellation

The uplink grant RX component 526 and/or uplink grant TX component 544 may be configured to reduce ULL transmission delays due to scheduled uplink (e.g., LTE) transmissions. For example, the uplink grant TX component 544 may be configured to send an indication that one or more uplink grants are cancelled. The uplink grant RX component 526 may be configured to receive the indication that one or more uplink grants are cancelled from uplink grant TX component 544.

In conventional implementations of LAA, uplink transmissions can be scheduled for up to 16 ms from a single subframe. If an eNB needs to wait for the whole scheduled uplink duration before transmitting ULL traffic, then there may be significant delays for the ULL traffic. The present aspects include several techniques to mitigate this issue. For example, in an aspect, the eNB 102 can ignore uplink grants and start contending for access to the downlink channel. If the eNB 102 wins the contention, then the eNB 102 can start transmission. Other than scheduled UEs, all other UEs (e.g., UE 104) are always listening to the channel and therefore, the UEs may receive the eNB transmission. In another aspect, the eNB 102 can indicate on ULL-enabled licensed carrier that uplink grants are canceled. The eNB 102 can indicate a start subframe and end subframe for which the grants are canceled.

Fast Channel Access Schemes

Figure 8:
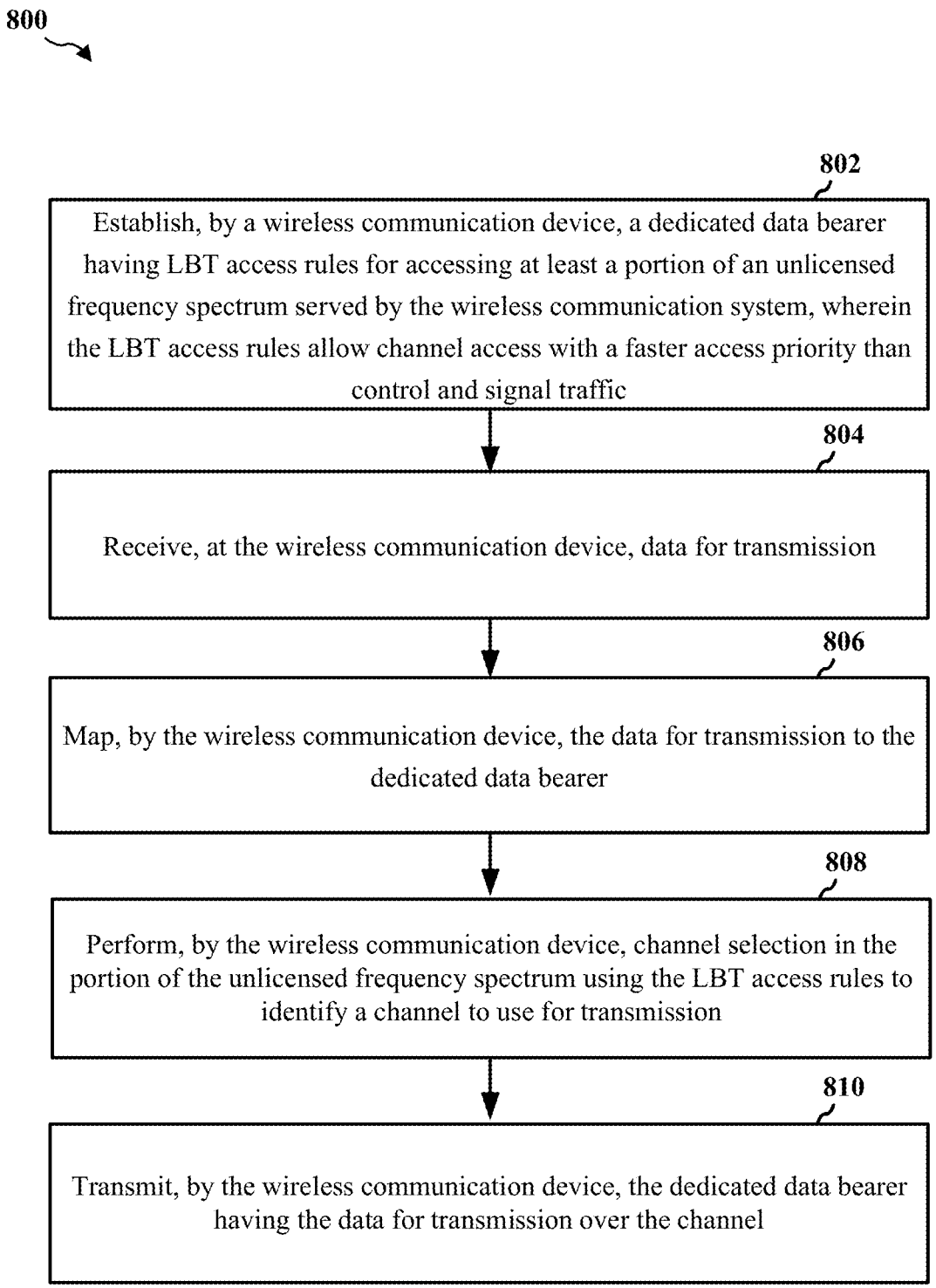
FIG. 8 is a diagram illustrating an example of a method for enabling fast channel access by mapping ULL traffic to a dedicated bearer in unlicensed spectrum in accordance with aspects described herein.

Referring to FIG. 8, an example of a method 800 of wireless communication includes reducing transmission latency in unlicensed spectrum. For example method 800 relates to the above-discussed implementation of defining a dedicated ULL data bearer for mapping ULL traffic onto unlicensed spectrum, and may be performed by the fast channel access component 510 and/or fast channel access component 528. In an aspect, method 800 may be performed by the fast channel access component 510, e.g., in conjunction with the processor(s) 503, memory 505 and/or UE transceiver 506. In an aspect, method 800 may be performed by the fast channel access component 528, e.g., in conjunction with the processor(s) 553, memory 555, and/or eNB transceiver 556.

At block 802, method 800 includes establishing a dedicated data bearer having LBT access rules for accessing at least a portion of an unlicensed frequency spectrum served by the wireless communication system, where the LBT access rules allow channel access with a faster access priority than control and signal traffic (e.g., in less than 1 ms). In an aspect, the established dedicated data bearer may be, for example, a dedicated ULL data bearer. Additionally, the established dedicated data bearer may have LBT access rules that allow channel access in less than or equal to 2 ms per slot, for example.

At block 804, method 800 includes receiving data for transmission. For example, the received data for transmission can be associated with a transmission time interval that is shorter than a TTI for control and signal traffic, e.g., less than 1 ms. In an aspect, the received data may be ULL data, for example.

At block 806, method 800 includes mapping the data for transmission to the dedicated data bearer. In an aspect, where method 800 includes establishing a dedicated ULL data bearer, mapping the data for transmission to the dedicated data bearer may include mapping the dedicated ULL data bearer to an LBT priority class 1 data bearer.

At block 808, method 800 includes performing channel selection in the portion of the unlicensed frequency spectrum using the LBT access rules to identify a channel to use for transmission.

At block 810, method 800 includes transmitting the data on the dedicated data bearer over the channel. For example, the ULL data is transmitted on the dedicated ULL data bearer over the selected channel.

Fast Channel Access Schemes

Figure 9:
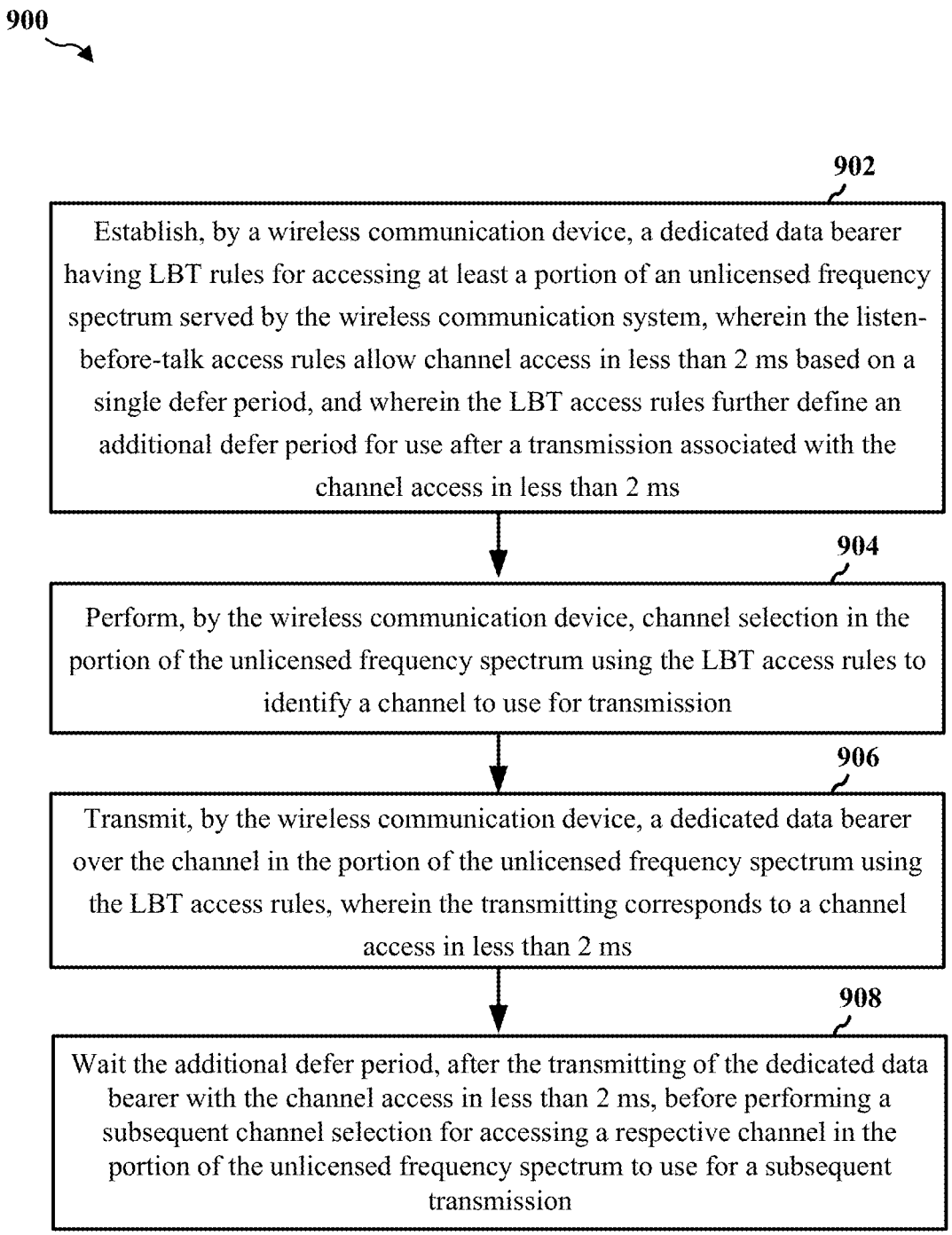
FIG. 9 is a diagram illustrating an example of a method for waiting to access a channel in the unlicensed spectrum after transmitting ULL data over the channel in the unlicensed spectrum in accordance with aspects described herein.

Referring to FIG. 9, an example aspect of a method 900 of wireless communication includes reducing transmission latency in unlicensed spectrum. For example, method 900 relates to the above-discussed implementation of waiting to access a channel in the unlicensed spectrum after transmitting ULL data over the channel in the unlicensed spectrum, and may be performed by fast channel access component 510 and/or fast channel access component 528. In an aspect, method 900 may be performed by the fast channel access component 510, e.g., in conjunction with the processor(s) 503, memory 505 and/or UE transceiver 506. In an aspect, method 900 may be performed by the fast channel access component 528, e.g., in conjunction with the processor(s) 553, memory 555, and/or eNB transceiver 556.

At block 902, method 900 includes establishing a dedicated data bearer having LBT rules for accessing at least a portion of an unlicensed frequency spectrum served by the wireless communication system, where the listen-before-talk access rules may allow channel access in less than 2 ms based on a single defer period, and where the LBT access rules may further define an additional defer period for use after a transmission associated with the channel access in less than 2 ms. In an aspect, the additional defer period may have a time value greater than the single defer period. Further, the additional defer period may include a contention window size greater than an LBT contention window size for an LBT priority class 1 data bearer.

At block 904, method 900 includes performing channel selection in the portion of the unlicensed frequency spectrum using the LBT access rules to identify a channel to use for transmission.

At block 906, method 900 includes transmitting a dedicated data bearer over the channel in the portion of the unlicensed frequency spectrum using the LBT access rules, wherein the transmitting corresponds to a channel access in less than 2 ms.

At block 908, method 900 includes waiting the additional defer period, after the transmitting of the dedicated data bearer with the channel access in less than 2 ms, before performing a subsequent channel selection for accessing a respective channel in the portion of the unlicensed frequency spectrum to use for a subsequent transmission.

CW Update

Figure 10:
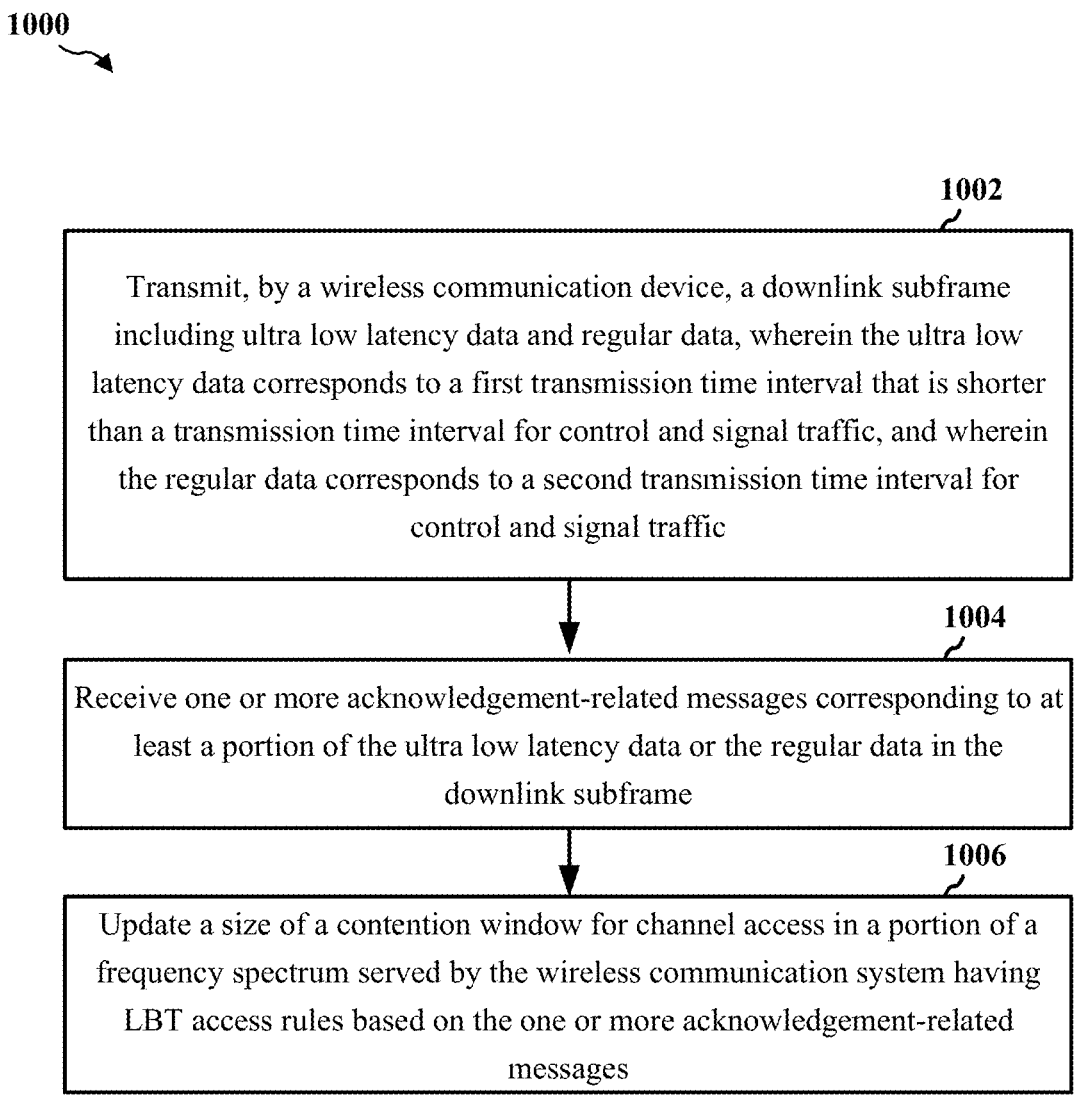
FIG. 10 is a diagram illustrating an example of a method for updating a contention window size in accordance with aspects described herein.

Referring to FIG. 10, an example aspect of a method 1000 of wireless communication includes reducing transmission latency in unlicensed spectrum. For example, method 1000 relates to the above-discussed implementation of updating a contention window size, and may be performed by the contention window update component 512 and/or contention window update component 530. In an aspect, method 1000 may be performed by the contention window update component 512, e.g., in conjunction with the processor(s) 503, memory 505 and/or UE transceiver 506. In an aspect, method 1000 may be performed by the contention window update component 530, e.g., in conjunction with the processor(s) 553, memory 555, and/or eNB transceiver 556.

At block 1002, method 1000 includes transmitting a downlink subframe including ULL data and regular (e.g., LTE) data, where the ULL data corresponds to a first transmission time interval that is shorter than a TTI for control and signal traffic, e.g., less than 1 ms, and wherein the regular data corresponds to a second transmission time interval for control and signal traffic, e.g., at least 1 ms.

At block 1004, method 1000 includes receiving one or more acknowledgement-related messages corresponding to at least a portion of the ULL data or the regular data in the downlink subframe. In an aspect, the one or more received acknowledgement-related messages (e.g., HARQ-ACK feedback) may be transmitted within an initial time period of a total time period for transmitting the downlink subframe.

At block 1006, method 1000 includes updating a size of a contention window for channel access in a portion of an unlicensed frequency spectrum served by the wireless communication system having LBT access rules based on the one or more acknowledgement-related messages. In an aspect, the size of the contention window may be updated by applying a first weighting factor to each acknowledgement-related message received for the ULL data and by applying a second weighting factor to each acknowledgement-related message received for the regular data. Additionally, in an aspect, the first weighting factor may have a different value than the second weighting factor.

CPDCCH Based Signaling of New Frame Structure

Figure 11:
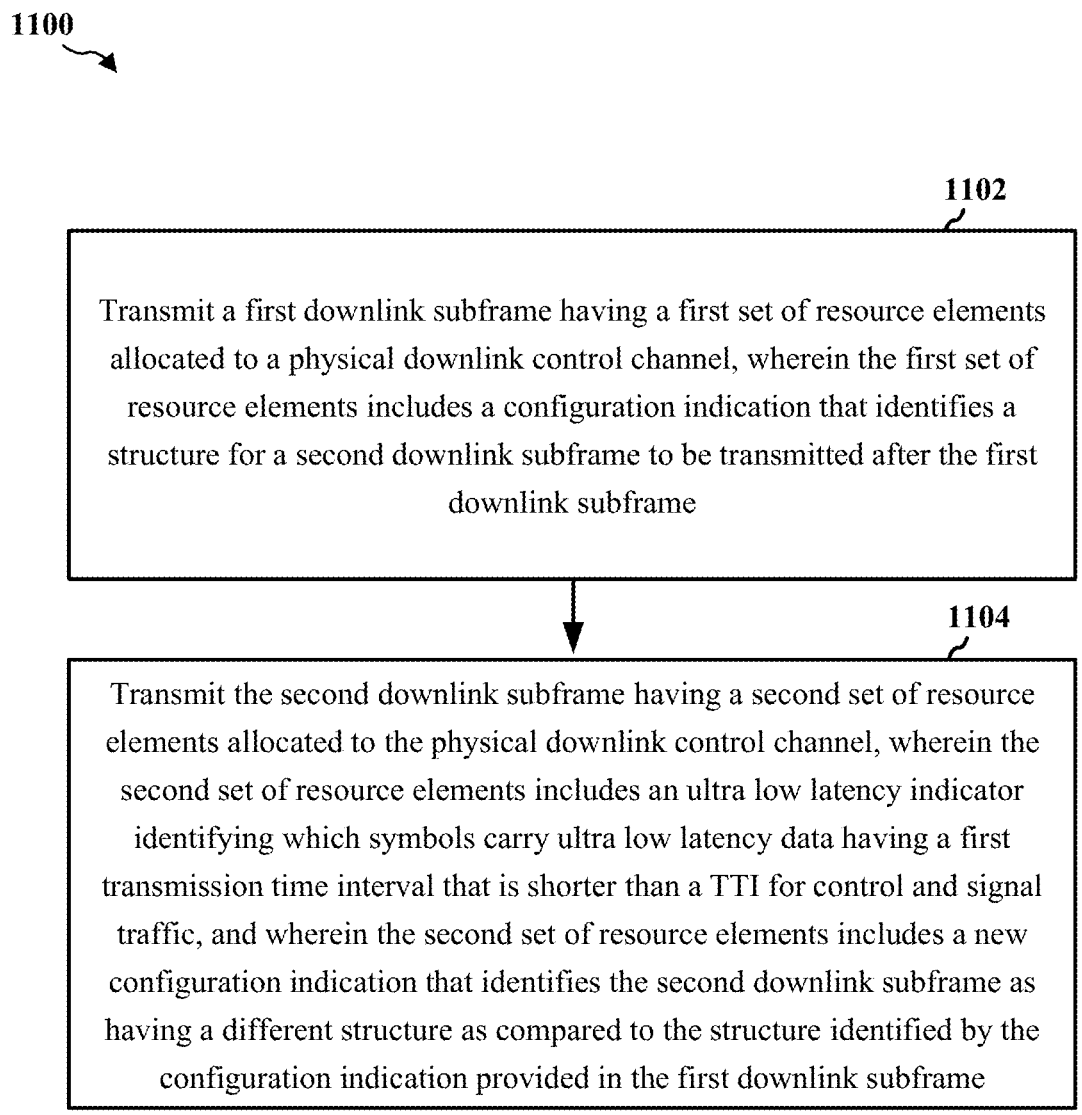
FIG. 11 is a diagram illustrating an example of a method for enhancing CPDCCH-based signaling to accommodate the ULL frame structure in accordance with aspects described herein.

Referring to FIG. 11, an example aspect of a method 1100 of wireless communication includes reducing transmission latency in unlicensed spectrum. For example, method 1100 relates to the above-discussed implementation of enhancing CPDCCH-based signaling to accommodate the ULL frame structure, and may be performed by the contention window update component 512 and/or contention window update component 530. In an aspect, method 1100 may be performed by the contention window update component 512, e.g., in conjunction with the processor(s) 503, memory 505 and/or UE transceiver 506. In an aspect, method 1100 may be performed by the contention window update component 530, e.g., in conjunction with the processor(s) 553, memory 555, and/or eNB transceiver 556.

At block 1102, method 1100 includes transmitting a first downlink subframe having a first set of resource elements allocated to a physical downlink control channel, wherein the first set of resource elements includes a configuration indication that identifies a structure for a second downlink subframe to be transmitted after the first downlink subframe.

At block 1104, method 1100 includes transmitting the second downlink subframe having a second set of resource elements allocated to the physical downlink control channel, where the second set of resource elements includes an ULL indicator identifying which symbols carry ULL data having a first transmission time interval that is shorter than a TTI for control and signal traffic, e.g., less than 1 ms, and where the second set of resource elements includes a new configuration indication that identifies the second downlink subframe as having a different structure as compared to the structure identified by the configuration indication provided in the first downlink subframe. In an aspect, the new configuration indication identifies a new subframe type selected from a plurality of subframe types including any two or more of a downlink subframe, an uplink subframe, a first flexible subframe, and a second flexible subframe having a different flexible structure than the first flexible subframe. Moreover, in an aspect, the second downlink subframe may be transmitted according to structure restriction rules that limits a format of the different structure of the second downlink subframe based on the structure identified by the configuration indication provided in the first downlink subframe.

Interference Handling

Figure 12:
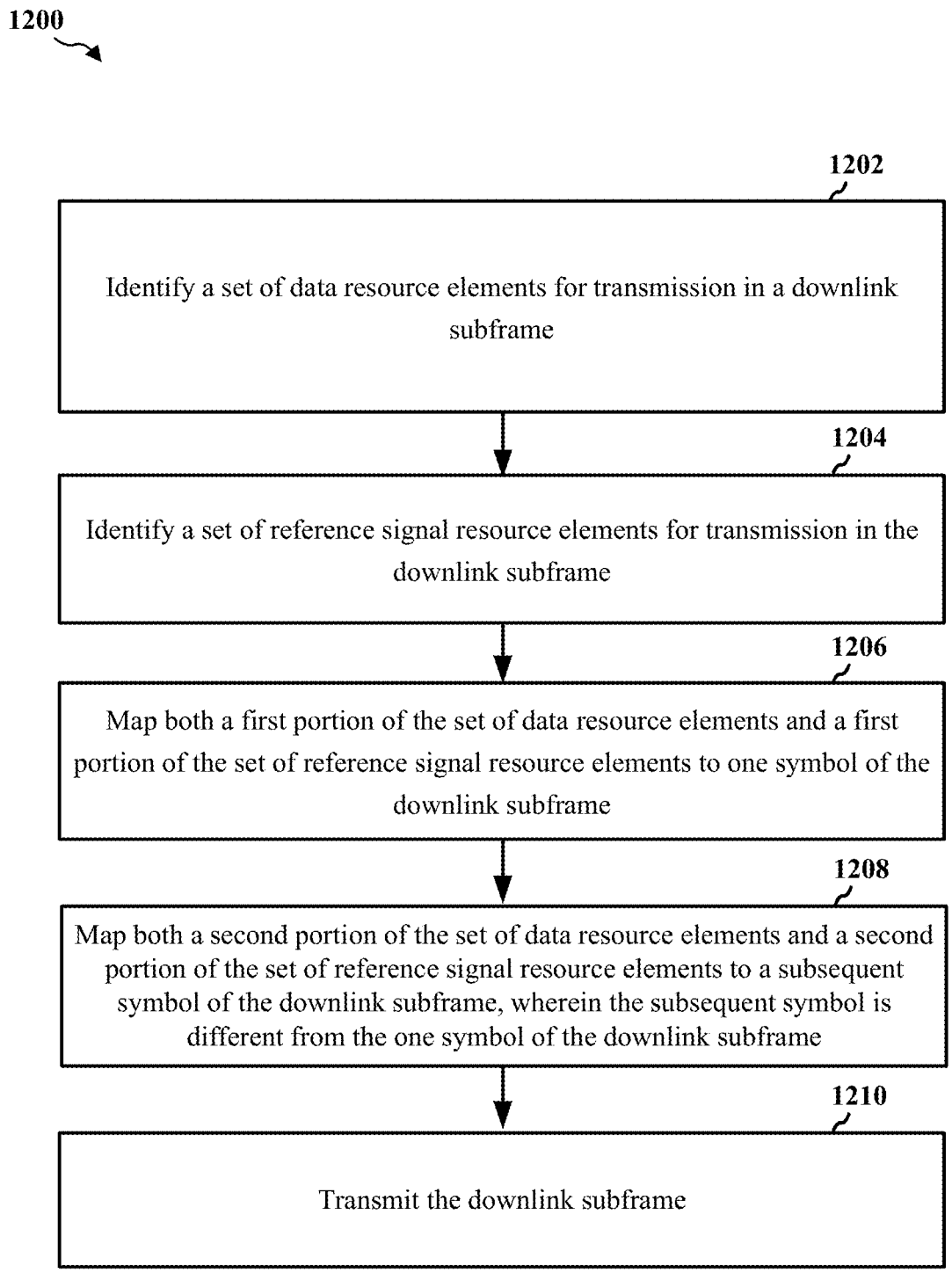
FIG. 12 is a diagram illustrating an example of a method for providing robust operation against bursty interference for ULL transmissions in accordance with aspects described herein.

Referring to FIG. 12, an example aspect of a method 1200 of wireless communication includes reducing transmission latency in unlicensed spectrum. For example, method 1200 relates to the above-discussed implementation of providing robust operation against bursty interference for ULL transmissions, and may be performed by the interference handling component 516 and/or interference handling component 534. In an aspect, method 1200 may be performed by the interference handling component 516, e.g., in conjunction with the processor(s) 503, memory 505 and/or UE transceiver 506. In an aspect, method 1200 may be performed by the interference handling component 534, e.g., in conjunction with the processor(s) 553, memory 555, and/or eNB transceiver 556.

At block 1202, method 1200 includes identifying a set of data resource elements for transmission in a downlink subframe.

At block 1204, method 1200 includes identifying a set of reference signal resource elements for transmission in the downlink subframe.

At block 1206, method 1200 includes mapping both a first portion of the set of data resource elements and a first portion of the set of reference signal resource elements to one symbol of the downlink subframe.

At block 1208, method 1200 includes mapping both a second portion of the set of data resource elements and a second portion of the set of reference signal resource elements to a subsequent symbol of the downlink subframe, wherein the subsequent symbol is different from the one symbol of the downlink subframe. In an aspect, mapping the first portion of the set of reference signal resource elements and mapping the second portion of the set of reference signal resource elements may further comprise assigning a greater number of the set of reference signal resource elements to the one symbol than to the subsequent symbol.

At block 1210, method 1200 includes transmitting the downlink subframe.

DRX Management for ULL

Figure 13:
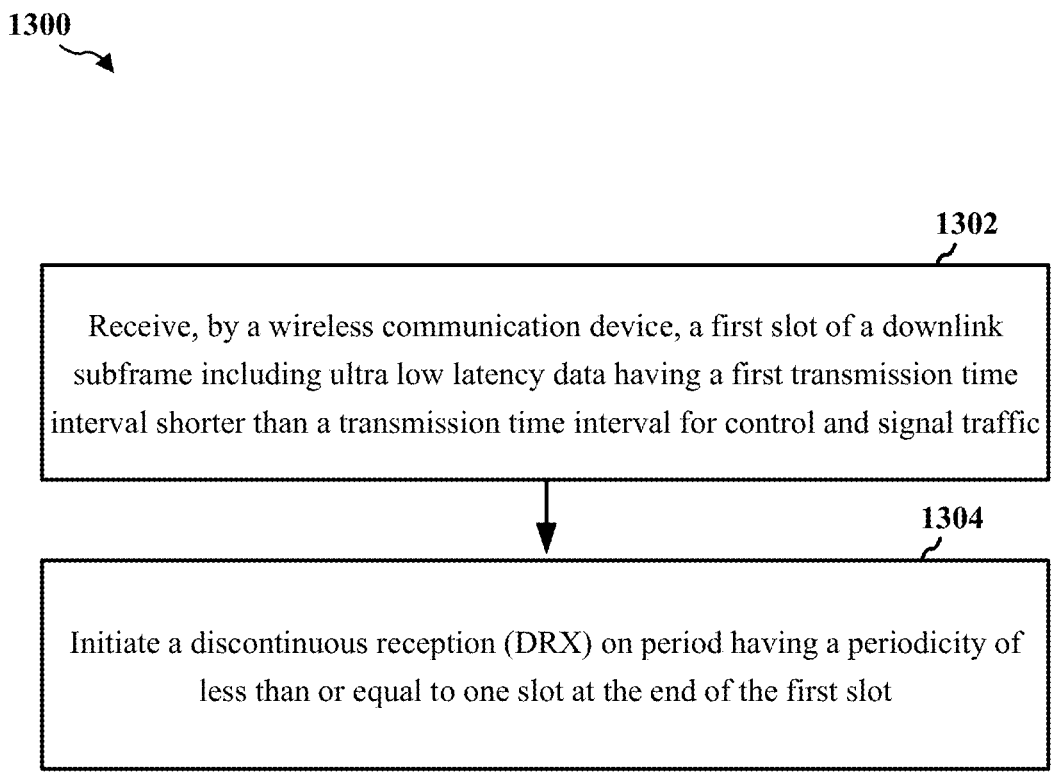
FIG. 13 is a diagram illustrating an example of a method for managing DRX for ULL traffic in accordance with aspects described herein.

Referring to FIG. 13, an example aspect of a method 1300 of wireless communication includes reducing transmission latency in unlicensed spectrum. For example, method 1300 relates to the above-discussed implementation of managing discontinuous reception (DRX) for ULL traffic, and may be performed by the DRX management component 518 and/or DRX management component 536. In an aspect, method 1300 may be performed by the DRX management component 518, e.g., in conjunction with the processor(s) 503, memory 505 and/or UE transceiver 506. In an aspect, method 1300 may be performed by the DRX management component 536, e.g., in conjunction with the processor(s) 553, memory 555, and/or eNB transceiver 556.

At block 1302, method 1300 includes receiving a first slot of a downlink subframe including ULL data having a first transmission time interval that is shorter than a TTI for control and signal traffic, e.g., less than 1 ms.

At block 1304, method 1300 includes initiating a discontinuous reception (DRX) on period having a periodicity of less than or equal to one slot at the end of the first slot. In an aspect, the DRX on period may be initiated with the periodicity of 1 symbol, 2 symbols, or 1 slot.

Joint Scheduling of Different TTI Durations

Figure 14:
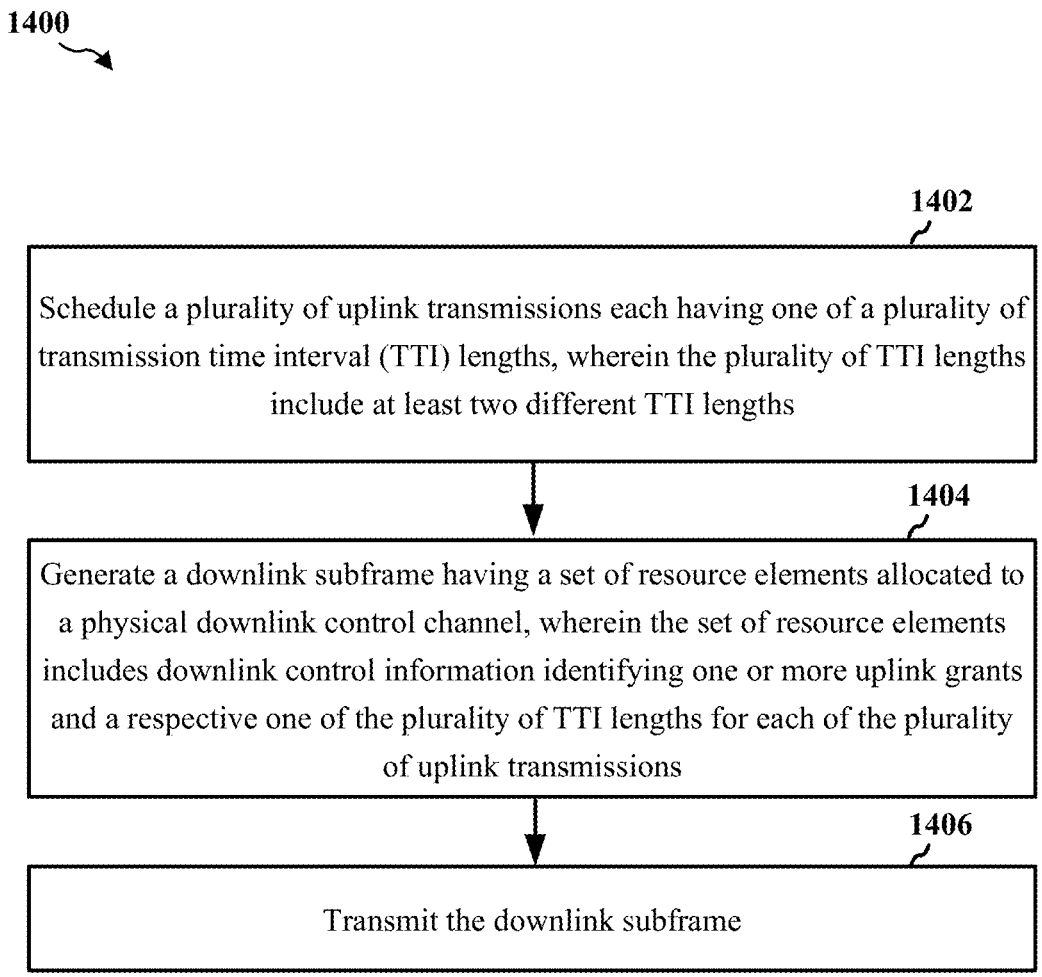
FIG. 14 is a diagram illustrating an example of a method for jointly scheduling TTIs for ULL traffic in accordance with aspects described herein.

Referring to FIG. 14, an example aspect of a method 1400 of wireless communication includes reducing transmission latency in unlicensed spectrum. For example, method 1400 relates to the above-discussed implementation of jointly scheduling TTIs for ULL traffic, and may be performed by the multi-TTI scheduling TX component 538, e.g., in conjunction with the processor(s) 553, memory 555, and/or eNB transceiver 556.

At block 1402, method 1400 includes scheduling a plurality of uplink transmissions each having one of a plurality of transmission time interval (TTI) lengths, wherein the plurality of TTI lengths include at least two different TTI lengths.

At block 1404, method 1400 includes generating a downlink subframe having a set of resource elements allocated to a physical downlink control channel, wherein the set of resource elements includes downlink control information identifying one or more uplink grants and a respective one of the plurality of TTI lengths for each of the plurality of uplink transmissions.

At block 1406, method 1400 includes transmitting the downlink subframe. For example, in an aspect, the multi-TTI scheduling TX component 538 may transmit the downlink subframe to multi-TTI scheduling RX component 520.

SRS Transmission Opportunities

Figure 15:
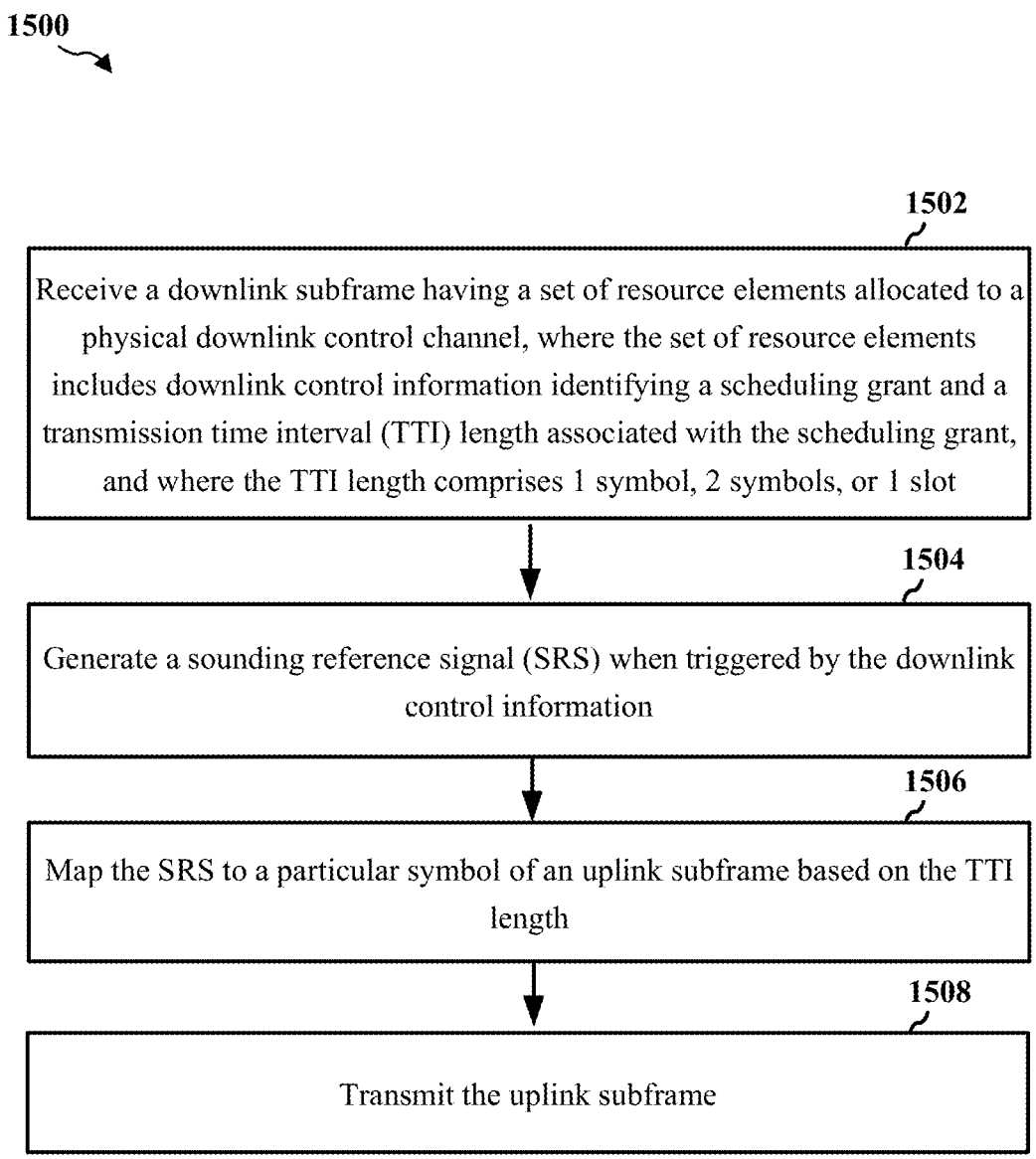
FIG. 15 is a diagram illustrating an example of a method for updating SRS transmission opportunities in accordance with aspects described herein.

Referring to FIG. 15, an example aspect of a method 1500 of wireless communication includes reducing transmission latency in unlicensed spectrum. For example, method 1500 relates to the above-discussed implementation of updating SRS transmission opportunities, and may be performed by the SRS controller component 522, e.g., in conjunction with the processor(s) 503, memory 505 and/or UE transceiver 506.

At block 1502, method 1500 includes receiving a downlink subframe having a set of resource elements allocated to a physical downlink control channel, where the set of resource elements includes downlink control information identifying a scheduling grant and a transmission time interval (TTI) length associated with the scheduling grant, and wherein the TTI length comprises 1 symbol, 2 symbols, or 1 slot. In an aspect, SRS controller component 522 may receive the downlink subframe from, e.g., SRS controller component 540.

At block 1504, method 1500 includes generating a sounding reference signal (SRS) when triggered by the downlink control information.

At block 1506, method 1500 includes mapping the SRS to a particular symbol of an uplink subframe based on the TTI length.

At block 1508, method 1500 includes transmitting the uplink subframe. For example, in an aspect, the uplink subframe may be transmitted to SRS controller component 540.

PRACH Transmissions

Figure 16:
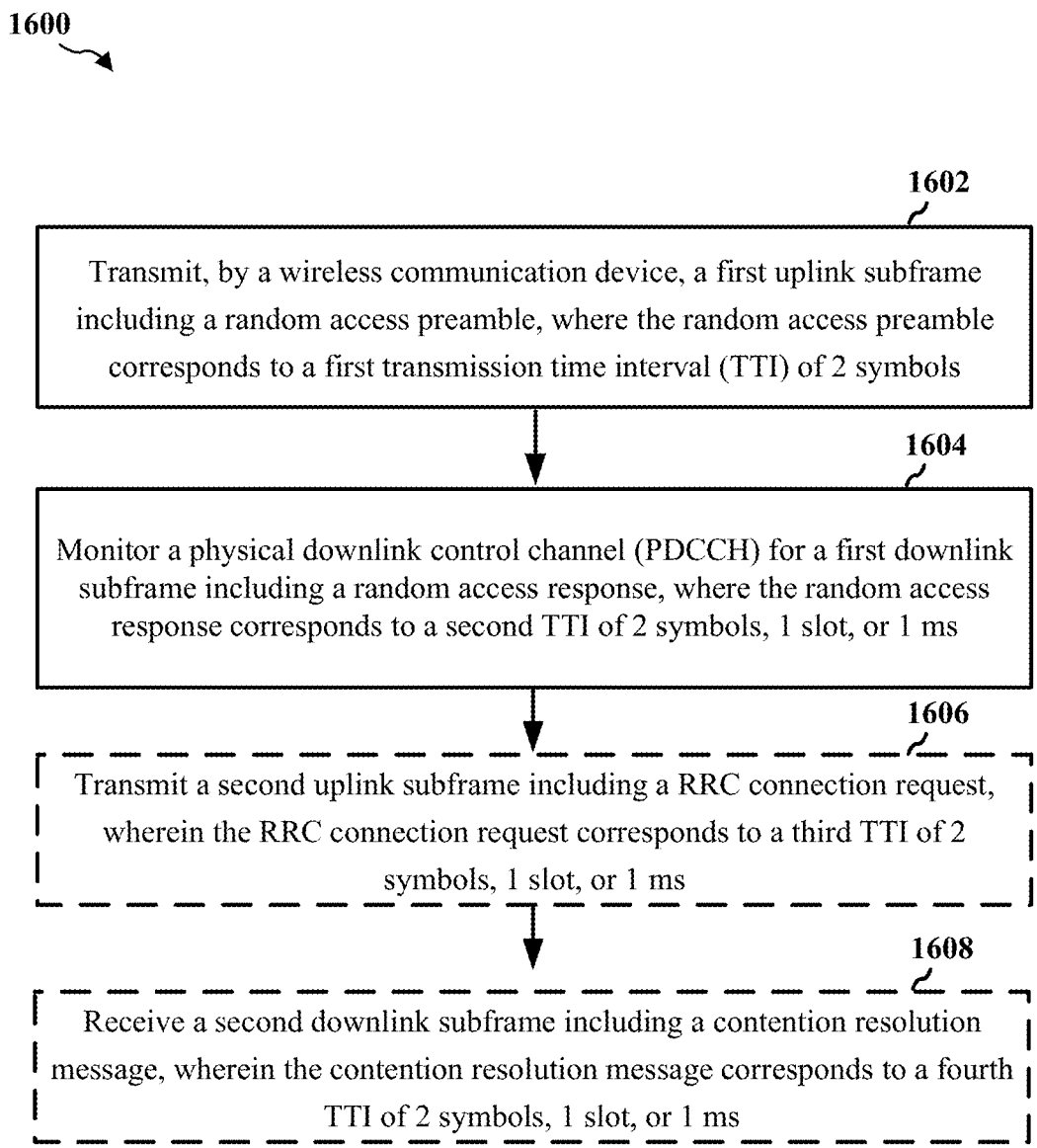
FIG. 16 is a diagram illustrating an example of a method for reducing delays associated with PRACH transmissions in accordance with aspects described herein.

Referring to FIG. 16, an example aspect of a method 1600 of wireless communication includes reducing transmission latency in unlicensed spectrum. For example, method 1600 relates to the above-discussed implementation of reducing latency associated with PRACH transmissions, and may be performed by the PRACH transmission component 524 and/or PRACH transmission component 542. In an aspect, method 1600 may be performed by the PRACH transmission component 524, e.g., in conjunction with the processor(s) 503, memory 505 and/or UE transceiver 506. In an aspect, method 1600 may be performed by the PRACH transmission component 542, e.g., in conjunction with the processor(s) 553, memory 555, and/or eNB transceiver 556.

At block 1602, method 1600 includes transmitting a first uplink subframe including a random access preamble, wherein the random access preamble corresponds to a first transmission time interval (TTI) of 2 symbols.

At block 1604, method 1600 includes monitoring a physical downlink control channel (PDCCH) for a first downlink subframe including a random access response, where the random access response corresponds to a second TTI of 2 symbols, 1 slot, or 1 ms. Additionally, in an aspect, monitoring the PDCCH may comprise monitoring the PDCCH during a duration of a response window, where the duration of the response window may be less than 1 ms.

At block 1606, method 1600 optionally includes transmitting a second uplink subframe including a RRC connection request, wherein the RRC connection request corresponds to a third TTI of 2 symbols, 1 slot, or 1 ms.

At block 1608, method 1600 optionally includes receiving a second downlink subframe including a contention resolution message, where the contention resolution message corresponds to a fourth TTI of 2 symbols, 1 slot, or 1 ms.

UL Grant Cancellation

Figure 17:
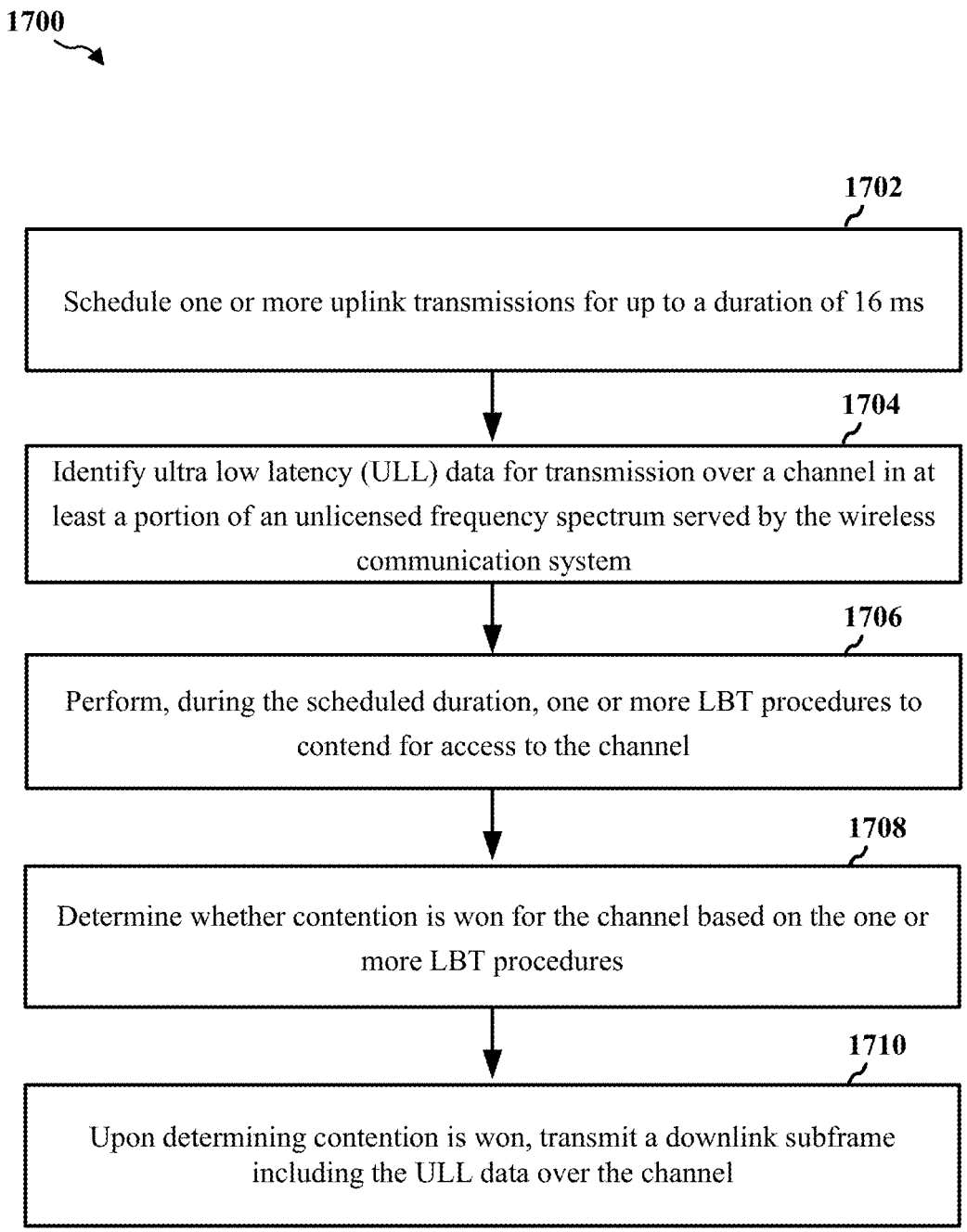
FIG. 17 is a diagram illustrating an example of a method for reducing downlink ULL transmission delays by ignoring scheduled uplink transmissions in accordance with aspects described herein.

Referring to FIG. 17, an example aspect of a method 1700 of wireless communication includes reducing transmission latency in unlicensed spectrum. For example, method 1700 relates to the above-discussed implementation of reducing ULL transmission delays by ignoring scheduled uplink (e.g., LTE) transmissions, and may be performed by the uplink grant TX component 544, e.g., in conjunction with the processor(s) 553, memory 555, and/or eNB transceiver 556.

At block 1702, method 1700 includes scheduling one or more uplink transmissions for up to a duration of 16 ms. In aspect, the uplink grant TX component 544 may transmit a scheduling grant to, e.g., uplink grant RX component 526.

At block 1704, method 1700 includes identifying ultra low latency (ULL) data for transmission over a channel in at least a portion of an unlicensed frequency spectrum served by the wireless communication system.

At block 1706, method 1700 includes performing, during the scheduled duration, one or more LBT procedures to contend for access to the channel.

At block 1708, method 1700 includes determining whether contention is won for the channel based on the one or more LBT procedures.

At block 1710, method 1700 includes upon determining contention is won, transmitting a downlink subframe including the ULL data over the channel. For example, in an aspect, the uplink grant TX component 544 may transmit the downlink subframe to uplink grant RX component 526.

UL Grant Cancellation

Figure 18:
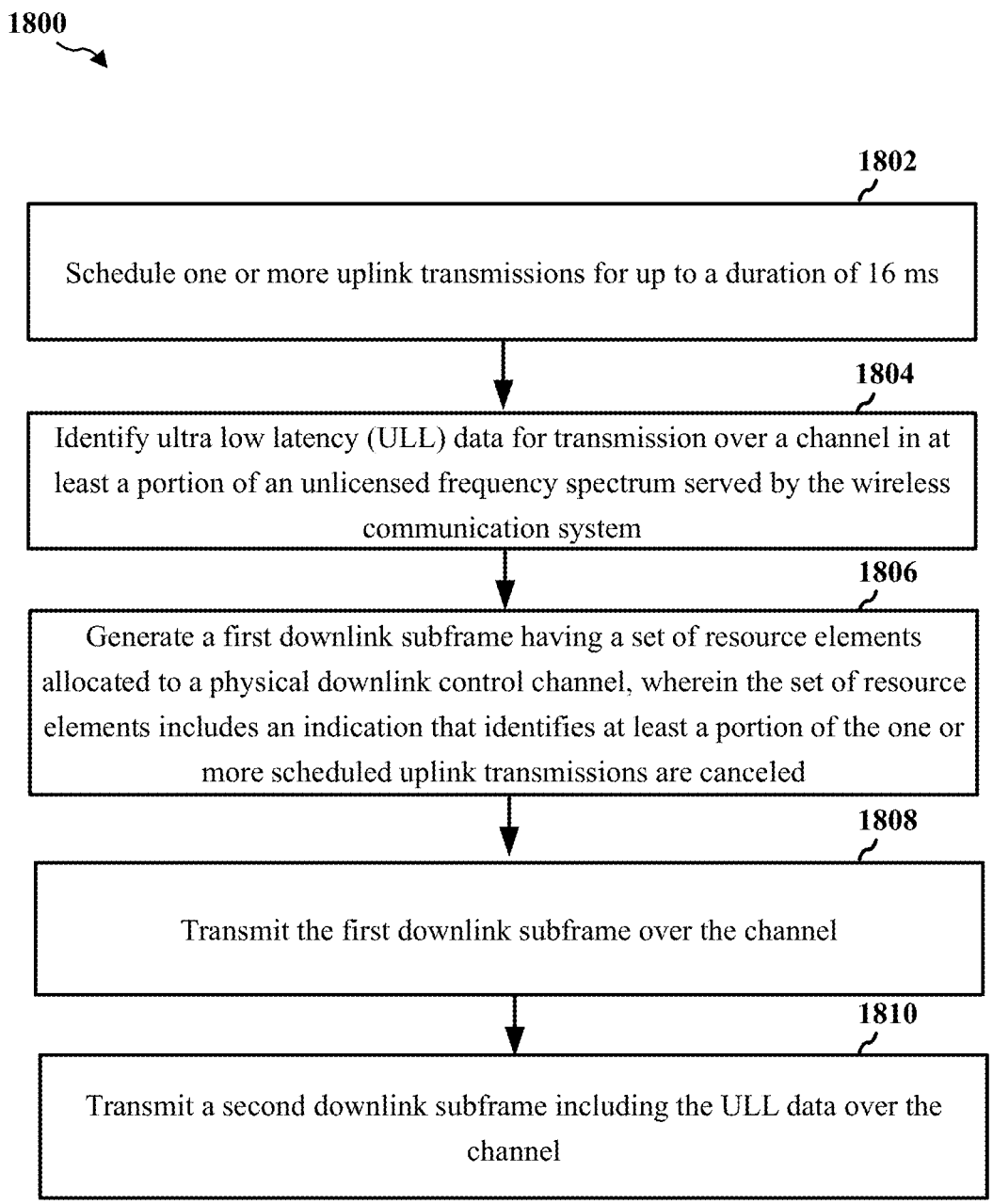
FIG. 18 is a diagram illustrating an example of a method for reducing downlink ULL transmission delays by cancelling scheduled uplink transmissions in accordance with aspects described herein.

Referring to FIG. 18, an example aspect of a method 1800 of wireless communication includes reducing transmission latency in unlicensed spectrum. For example, method 1800 relates to the above-discussed implementation of reducing ULL transmission delays by cancelling the scheduled uplink (e.g., LTE) transmissions, and may be performed by the uplink grant TX component 544, e.g., in conjunction with the processor(s) 553, memory 555, and/or eNB transceiver 556.

At block 1802, method 1800 includes scheduling one or more uplink transmissions for up to a duration of 16 ms. In aspect, the uplink grant TX component 544 may transmit a scheduling grant to, e.g., uplink grant RX component 526.

At block 1804, method 1800 includes identifying ULL data for transmission over a channel in at least a portion of an unlicensed frequency spectrum served by the wireless communication system.

At block 1806, method 1800 includes generating a first downlink subframe having a set of resource elements allocated to a physical downlink control channel, wherein the set of resource elements includes an indication that identifies at least a portion of the one or more scheduled uplink transmissions are cancelled.

At block 1808, method 1800 includes transmitting the first downlink subframe over the channel. For example, in an aspect, the uplink grant TX component 544 may transmit the first downlink subframe to uplink grant RX component 526.

At block 1810, method 1800 includes transmitting a second downlink subframe including the ULL data over the channel. For example, in an aspect, the uplink grant TX component 544 may transmit the second downlink subframe to uplink grant RX component 526.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication in a wireless communication system including listen-before-talk (LBT) access for transmissions, comprising:
    scheduling one or more uplink transmissions;
    identifying ultra low latency (ULL) data for transmission over a channel in at least a portion of an unlicensed frequency spectrum served by the wireless communication system;
    generating a first downlink subframe having a set of resource elements allocated to a physical downlink control channel, wherein the set of resource elements includes an indication that identifies at least a portion of the one or more scheduled uplink transmissions are canceled;
    performing, during the scheduled duration, one or more LBT procedures to contend for access to the channel;
    determining whether contention is won for the channel based on the one or more LBT procedures; and
    upon determining contention is won, transmitting the first downlink subframe over the channel and the transmitting a second downlink subframe including the ULL data over the channel.

2. The method of claim 1, wherein the transmitting the first downlink subframe over the channel and transmitting the second downlink subframe over the channel are in at least the portion of the unlicensed frequency spectrum served by the wireless communication system.

3. The method of claim 2, wherein the one or more uplink transmissions are scheduled up to a duration of 16 milliseconds (ms).

4. The method of claim 2, further comprising ignoring scheduled uplink transmissions.

5. The method of claim 2, further comprising ignoring scheduled uplink Long Term Evolution (LTE) transmissions.

6. An apparatus for wireless communication using listen-before-talk (LBT) access for transmissions, comprising:
    a transceiver for communicating one or more wireless signals via one or more antennas;
    a memory configured to store instructions; and
    one or more processors communicatively couples with the transceiver and the memory, wherein the one or more processors are configured to:
    schedule one or more uplink transmissions;
    identify ultra low latency (ULL) data for transmission over a channel in at least a portion of an unlicensed frequency spectrum served by a wireless communication system;
    generate a first downlink subframe having a set of resource elements allocated to a physical downlink control channel, wherein the set of resource elements includes an indication that identifies at least a portion of the one or more scheduled uplink transmissions are canceled;
    perform, during the scheduled duration, one or more LBT procedures to contend for access to the channel;
    determine whether contention is won for the channel based on the one or more LBT procedures; and
    upon determining contention is won, transmit the first downlink subframe over the channel and transmitting a second downlink subframe including the ULL data over the channel.

7. The apparatus of claim 6, wherein the transmit the first downlink subframe over the channel and the transmit the second downlink subframe over the channel are in at least the portion of the unlicensed frequency spectrum served by the wireless communication system.

8. The apparatus of claim 7, wherein the one or more uplink transmissions are scheduled up to a duration of 16 milliseconds (ms).

9. The apparatus of claim 7, wherein the one or more processors is configured to ignore scheduled uplink transmissions.

10. The apparatus of claim 7, wherein the one or more processors is configured to ignore scheduled uplink Long Term Evolution (LTE) transmissions.

11. A non-transitory computer-readable medium storing computer code executable by a processor for wireless communication using listen-before-talk (LBT) access for transmissions, comprising code for:
scheduling one or more uplink transmissions;
identifying ultra low latency (ULL) data for transmission over a channel in at least a portion of an unlicensed frequency spectrum served by a wireless communication system;
generating a first downlink subframe having a set of resource elements allocated to a physical downlink control channel, wherein the set of resource elements includes an indication that identifies at least a portion of the one or more scheduled uplink transmissions are canceled;
performing, during the scheduled duration, one or more LBT procedures to contend for access to the channel;
determining whether contention is won for the channel based on the one or more LBT procedures; and
upon determining contention is won, transmitting the first downlink subframe over the channel and transmitting a second downlink subframe including the ULL data over the channel.

12. The non-transitory computer-readable medium of claim 11, wherein the transmitting the first downlink subframe over the channel and the transmitting the second downlink subframe over the channel are in at least the portion of the unlicensed frequency spectrum served by the wireless communication system.

13. The non-transitory computer-readable medium of claim 12, wherein the one or more uplink transmissions are scheduled up to a duration of 16 milliseconds (ms).

14. The non-transitory computer-readable medium of claim 12, further comprising code for ignoring scheduled uplink transmissions.

15. The non-transitory computer-readable medium of claim 12, further comprising code for ignoring scheduled uplink Long Term Evolution (LTE) transmissions.

* * * * *